United States Patent
Kurokawa et al.

(10) Patent No.: US 7,586,526 B2
(45) Date of Patent: Sep. 8, 2009

(54) IMAGE SENSING APPARATUS WITH AT LEAST TWO TRANSFER SPEEDS AND ITS CONTROL METHOD

(75) Inventors: Shinji Kurokawa, Kanagawa (JP); Yasuyuki Yamazaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 632 days.

(21) Appl. No.: 10/113,516

(22) Filed: Mar. 28, 2002

(65) Prior Publication Data

US 2002/0140844 A1 Oct. 3, 2002

(30) Foreign Application Priority Data

Mar. 29, 2001 (JP) .............................. 2001-097043
Jul. 4, 2001 (JP) .............................. 2001-203387

(51) Int. Cl.
*H04N 9/64* (2006.01)
*H04N 5/225* (2006.01)

(52) U.S. Cl. .................. 348/243; 348/241; 348/312; 348/314

(58) Field of Classification Search ................ 348/241, 348/243, 294–296, 312, 362–364, 314
See application file for complete search history.

(56) References Cited

U.S. PATENT DOCUMENTS

| | | | | |
|---|---|---|---|---|
| 4,556,911 A * | 12/1985 | Imaide et al. ............... 348/297 |
| 5,777,671 A * | 7/1998 | Maki et al. .................... 348/312 |
| 5,982,428 A * | 11/1999 | Charneski et al. ........... 348/312 |
| 6,144,407 A * | 11/2000 | Mizutani et al. .......... 348/220.1 |
| 6,285,399 B1* | 9/2001 | Tao ............................. 348/312 |
| 6,304,292 B1* | 10/2001 | Ide et al. ...................... 348/243 |
| 6,509,928 B1* | 1/2003 | Ogawa et al. ................ 348/312 |
| 6,778,215 B1* | 8/2004 | Nakashima et al. ......... 348/314 |
| 6,829,007 B1* | 12/2004 | Bilhan et al. ................. 348/243 |
| 6,906,751 B1* | 6/2005 | Norita et al. ................. 348/349 |
| 7,298,407 B2* | 11/2007 | Moberg et al. .............. 348/312 |
| 7,365,785 B2* | 4/2008 | Hashimoto et al. .......... 348/314 |
| 7,391,455 B2* | 6/2008 | Oda ............................. 348/314 |
| 2004/0174439 A1* | 9/2004 | Upton ...................... 348/222.1 |

* cited by examiner

*Primary Examiner*—David L Ometz
*Assistant Examiner*—Carramah J Quiett
(74) *Attorney, Agent, or Firm*—Cowan, Liebowitz & Latman, P.C.

(57) ABSTRACT

In an image sensing apparatus which has an image sensing element having a plurality of pixels which generate charges in correspondence with the amount of incoming light, and a transfer unit which transfers charge signals generated by the plurality of pixels, first reading of said transfer unit and a second reading are performed after the image sensing element is exposed for a predetermined period of time and before the charge signals accumulated on the pixels are transferred to the transfer unit, wherein a transfer speed used in the second reading is different from a transfer speed used in the first reading.

10 Claims, 24 Drawing Sheets

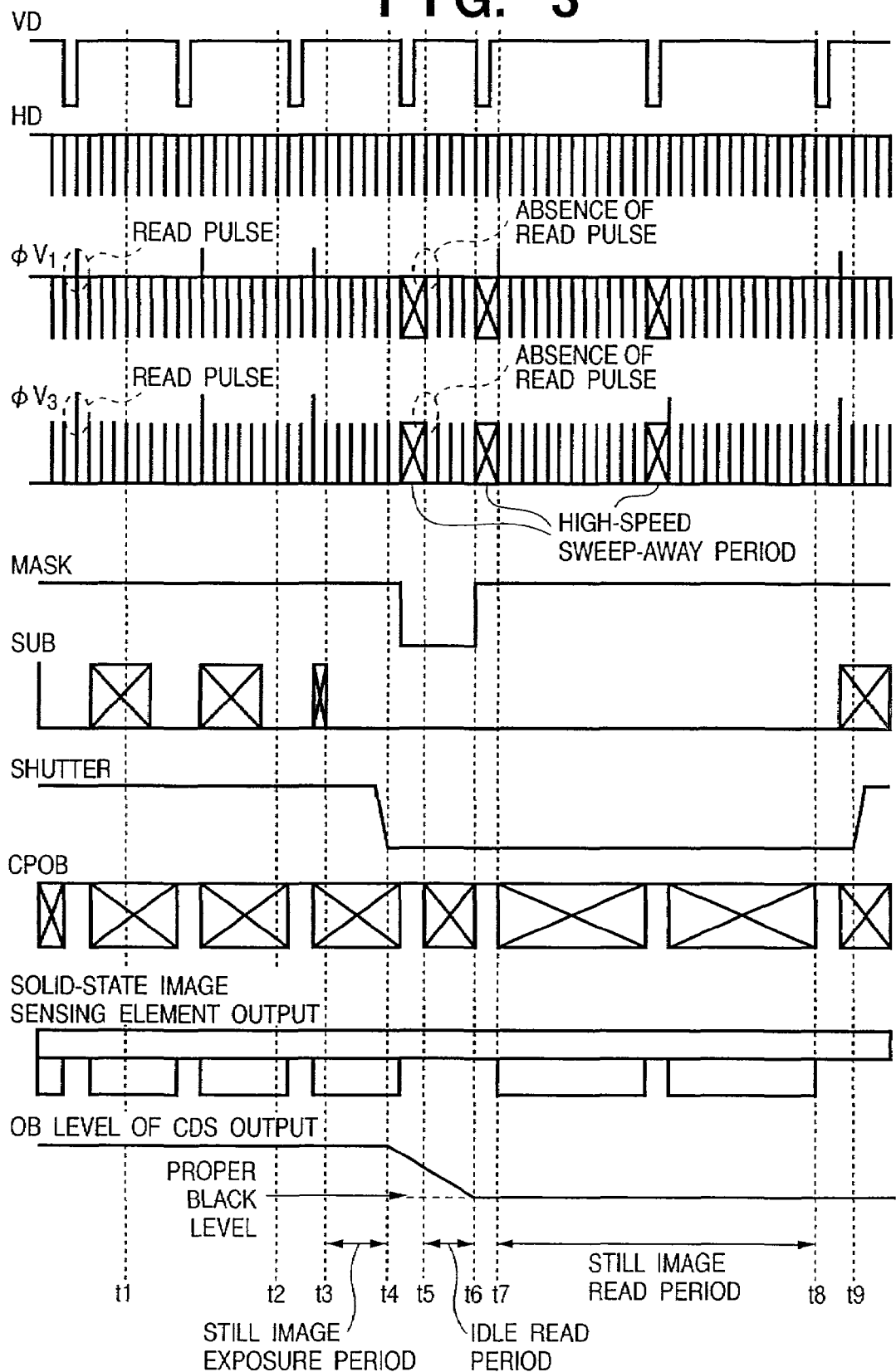

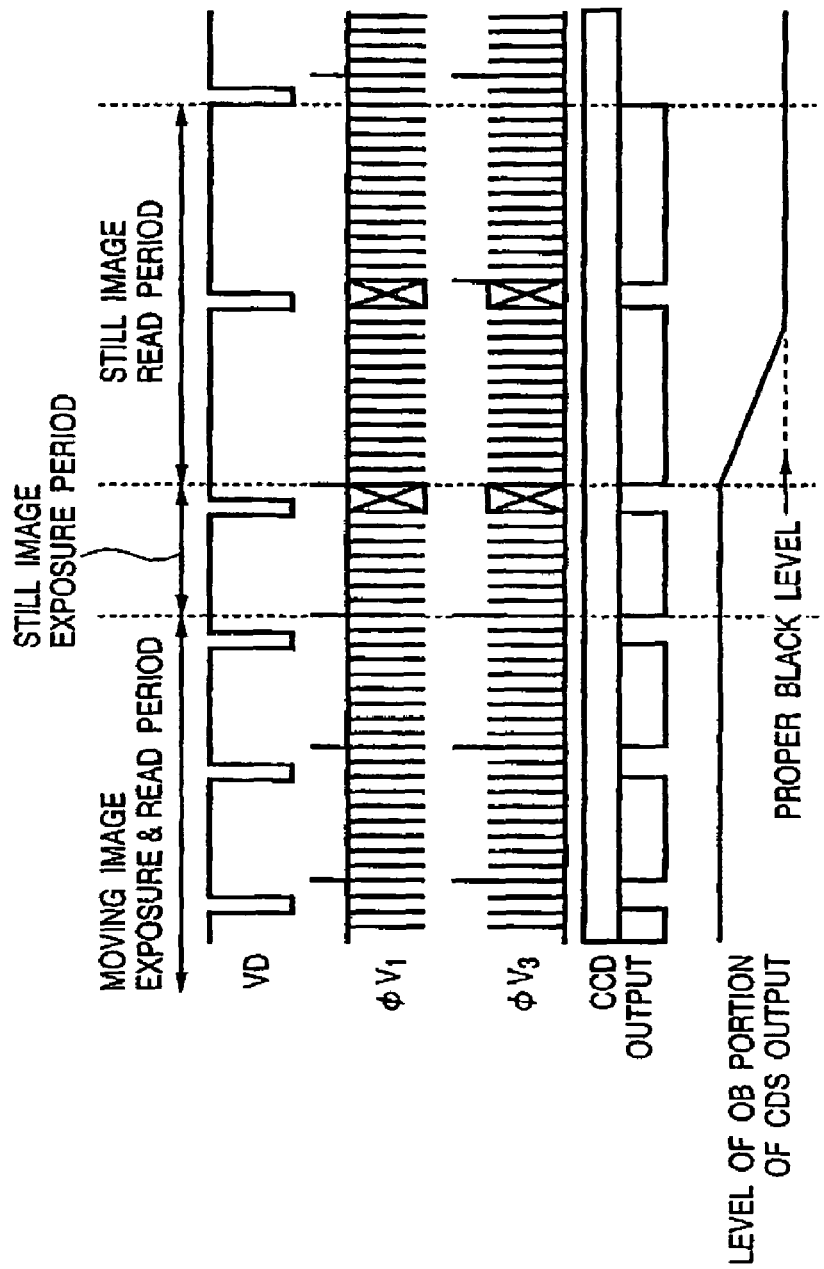

IMAGE SENSING APPARATUS WITH AT LEAST TWO TRANSFER SPEEDS AND ITS CONTROL METHOD

FIELD OF THE INVENTION

The present invention relates to an image sensing apparatus and, more particularly, to a read process of a signal from an image sensing apparatus, its control method, and a program.

BACKGROUND OF THE INVENTION

Conventionally, various image sensing apparatuses using solid-state image sensing elements (e.g., CCD) have been proposed. FIG. 19 is a block diagram showing the arrangement from a solid-state image sensing element to a clamp circuit in a conventional image sensing apparatus. In such an image sensing apparatus, light from an object, which has entered via a lens, is received by a solid-state image sensing element 13, and an output signal from the solid-state image sensing element 13 is input to a CDS unit 14 that performs correlated double sampling (to be abbreviated as CDS hereinafter) to remove clocks and to reduce noise. The output signal from the CDS unit 14 is input to a clamp circuit 15, which clamps the output (corresponds to a black level) from an optical black (to be abbreviated as OB hereinafter) portion, which is formed by light-shielded pixels of the solid-state image sensing element 13, to a given DC potential under the control of a clamp pulse signal CPOB, thereby generating a signal level serving as a black reference. After that, an image signal is A/D-converted by an A/D converter, and the converted image data is input to a signal processor in the subsequent stage to undergo various signal processes and conversions to obtain a signal of a desired display or recording format.

FIGS. 20A and 20B show the basic arrangement of the solid-state image sensing element 13. The solid-state image sensing element has an effective pixel region 111 capable of receiving light from an object, and an optical black region 112 shielded from light by, e.g., aluminum. Pixels in the effective pixel region 111 and optical black region 112 respectively have photodiodes 113 and 114. In FIG. 20B, the photodiodes 113 of the effective pixel region 111 are indicated by open squares, and the photodiodes 114 of the optical black region 112 are indicated by hatched squares. The output from each photodiode 114 is used as a reference for an optical black level.

Furthermore, the solid-state image sensing element has vertical transfer registers 115 arranged along arrays of the photodiodes 113 and 114, and a horizontal transfer register 116 for transferring charge signals from the vertical transfer registers 115 to an output circuit 117. With this arrangement, charge signals photoelectrically converted by the photodiodes 113 are sent to the corresponding vertical transfer registers 115, and are then sequentially sent to the horizontal transfer register 116 in synchronism with vertical transfer pulse signals φV1 to φV4. The charge signals sent to the horizontal transfer register 116 are sequentially sent to the output circuit 117 in synchronism with horizontal transfer pulse signals φH1 and φH2, and are then output to the subsequent circuits. Reference numeral 118 denotes a portion of the horizontal transfer register 116 to which no charge signals are transferred from the vertical transfer registers 115, i.e., a so-called dummy portion.

When a small clamp time constant is set in the clamp circuit 15 of the conventional image sensing apparatus shown in FIG. 19, different OB levels are sampled and held, and clamped between lines, and horizontal stripe-like noise consequently appears on an image, thus influencing image quality. For this reason, in the clamp circuit of the conventional image sensing apparatus, a relatively large time constant upon OB clamping must be set in consideration of image quality and response speed.

However, when very intense light such as spot light, sunlight, or the like has become incident on the solid-state image sensing element 13, charge signals generated by the receivable effective pixel region 111 overflow to reach the vertical transfer registers 115 and horizontal transfer register 116, and many charge signals are transferred even during a charge transfer period of pixels of the OB region 112, i.e., an OB period in which nearly no charge signals are supposed to be transferred. As a result, the OB level of a signal output from the CDS unit 14 becomes higher than a normal level, and is different from the black level to be obtained.

This phenomenon will be examined using FIGS. 21A and 21B. In a normal operation (when no intense light enters), the pixels of the effective pixel region 111 accumulate charges corresponding to object light, and the pixels of the OB region 112 do not produce any charges since they are shielded from light. Hence, the CCD outputs of the pixels of the effective pixel region 111 during the charge transfer period (effective pixel period) and OB period are as shown in FIG. 21A. The CDS unit 14 executes correlated double sampling by sampling and holding a reset level in response to a sample/hold pulse signal SH1, sampling and holding a signal level in response to a sample/hold pulse signal SH2, and extracting their difference as a signal level, thus obtaining a CDS output signal shown in FIG. 21A. Note that the CDS output waveform shown in FIG. 21A is converted to rise upward when the signal level is high (many charge signals are accumulated in the CCDs). When this CDS output signal is clamped during the OB period in which a clamp pulse signal changes to LOW, a constant DC potential is obtained and is used as the reference level upon executing subsequent A/D conversion and various signal processes.

On the other hand, when very intense light such as spot light, sunlight, or the like strikes, and when charge signals of the effective pixel region 111 overflow and are transferred even during the OB period, as indicated by the CCD output in FIG. 21B, the signal level of the CDS output during the OB period becomes higher than the proper black level. In this state, if the clamp circuit 15 clamps the CDS output during the OB period, the higher level is used as the reference level of signals. Hence, the level difference between the reference level and a signal from the effective pixel region 111 becomes small, and a dark video signal is obtained consequently. Furthermore, when the CDS output during the OB period has a higher potential, which becomes equal to that of the CDS output during the effective pixel period, the obtained video signal indicates solid black.

FIG. 22 shows the CDS output waveforms in normal operation during one horizontal period and when charge signals have overflowed into the OB region 112. As in a normal CDS output, if the OB level maintains a proper level, the signal level during the effective pixel period is correctly processed. However, as can be easily understood from the above description, if a signal is clamped at the varied black level indicated by a CDS output obtained when charge signals have overflowed in FIG. 22, a signal equal to or lower than the varied black level is determined to be black, and a dark video signal is obtained. Furthermore, as can be easily understood from the above description, when many charge signals have overflowed during the OB period and the highest levels of CDS output signals obtained during the OB period and effective pixel period have the same potential, a solid black image is consequently obtained.

When incidence of very intense light stops or when exposure is completed by a mechanical shutter like in photographing of a still image, charge signals that overflow into the vertical transfer registers 115 and horizontal transfer register 116 gradually decrease, and also do charge signals read out during the OB period. However, when a relatively large clamp time constant is set for the aforementioned reason, since it maintains a long period of time in which a level different from a proper level is clamped, a considerably long period of time is required until a correct level to be clamped is recovered.

As shown in FIG. 23, when a still image is photographed while charge signals overflow into the vertical transfer registers 115 and horizontal transfer registers 116 corresponding to the OB region 112, the OB level of the CDS output during the exposure period of that still image is higher than a proper black level. After a mechanical shutter is closed and exposure of the still image is completed, since light ceases to enter the solid-state image sensing element 13, there is a period, from the beginning of the read process of the still image from the solid-state image sensing element 13 to a certain timing, in which the clamp level is gradually returning a proper value but a proper black level cannot be obtained. For this reason, a portion of a frame cannot have proper luminance levels and, as a result, a desired image cannot be obtained.

SUMMARY OF THE INVENTION

The present invention has been made in consideration of the above situation, and has as its object to appropriately acquire a clamp level even when intense light enters, and to obtain an image with a proper level.

According to the present invention, the foregoing object is attained by providing an image sensing apparatus comprising: an image sensing element having a plurality of pixels which generate charges in correspondence with an amount of incoming light, and a transfer unit which transfers charge signals generated by the plurality of pixels; and a controller adapted to perform first reading of the transfer unit and a second reading using a transfer speed different from a transfer speed used in the first reading after the image sensing element is exposed for a predetermined period of time and before the charge signals accumulated on the pixels are transferred to the transfer unit.

According to the present invention, the foregoing object is also attained by providing a method of controlling an image sensing apparatus, which comprises an image sensing element having a plurality of pixels which generate charges in correspondence with an amount of incoming light, and a transfer unit which transfers charge signals generated by the plurality of pixels, comprising: performing first reading of the transfer unit; and performing second reading of the transfer unit using a transfer speed different from a transfer speed used in the first reading, wherein the first and second reading are performed after the image sensing element is exposed for a predetermined period of time and before the charge signals accumulated on the pixels are transferred to the transfer unit.

Furthermore, the foregoing object is also attained by providing an image sensing apparatus comprising: an image sensing element having a plurality of pixels which generate charges in correspondence with an amount of incoming light, and a transfer unit which transfers charge signals generated by the plurality of pixels; and a controller adapted to perform high-speed reading of the transfer unit a plurality of times after the image sensing element is exposed for a predetermined period of time and before the charge signals accumulated on the pixels are transferred to the transfer unit.

Further, the foregoing object is also attained by providing a method of controlling an image sensing apparatus, which comprises an image sensing element having a plurality of pixels which generate charges in correspondence with an amount of incoming light, and a transfer unit which transfers charge signals generated by the plurality of pixels, comprising: performing high-speed reading of the transfer unit a plurality of times after the image sensing element is exposed for a predetermined period of time and before the charge signals accumulated on the pixels are transferred to the transfer unit.

Further, the foregoing object is also attained by providing an image sensing apparatus comprising: an image sensing element having a plurality of pixels which generate charges in correspondence with an amount of incoming light, a part of the pixels belonging to a light-shielded region, a vertical transfer unit which transfers charges generated in the plurality of pixels in a vertical direction, and a horizontal transfer unit which transfers the charges transferred by the vertical transfer unit in the horizontal direction, wherein the horizontal transfer unit includes a dummy portion to which no charge is transferred from the vertical transfer unit; and a clamp pulse generator adapted to generate a clamp pulse for clamping charge signals obtained from the light-shielded region and charge signals from the dummy portion in one horizontal transfer period.

Further, the foregoing object is also attained by providing a method of controlling an image sensing apparatus, which comprises an image sensing element having a plurality of pixels which generate charges in correspondence with an amount of incoming light, a part of the pixels belonging to a light-shielded region, a vertical transfer unit which transfers charges generated in the plurality of pixels in a vertical direction, and a horizontal transfer unit which transfers the charges transferred by the vertical transfer unit in the horizontal direction, wherein the horizontal transfer unit includes a dummy portion to which no charge is transferred from the vertical transfer unit, the method comprising: controlling to clamp charge signals obtained from the light-shielded region and charge signals from the dummy portion in one horizontal transfer period.

Further, the foregoing object is also attained by providing an image sensing apparatus comprising: an image sensing element having a plurality of pixels which generate charges in correspondence with an amount of incoming light, and a transfer unit which transfers charge signals generated by the plurality of pixels; a clamp pulse generator adapted to generate a clamp pulse for clamping charge signals output from the image sensing element; and a controller adapted to control generation of the clamp pulse output by the clamp pulse generator in accordance with an amount of light which illuminates a predetermined region of the image sensing element.

Further, the foregoing object is also attained by providing a method of controlling an image sensing apparatus, which comprises an image sensing element having a plurality of pixels which generate charges in correspondence with an amount of incoming light, and a transfer unit which transfers charge signals generated by the plurality of pixels, the method comprising: controlling generation of the clamp pulse for clamping charge signals output from the image sensing element in accordance with an amount of light which illuminates a predetermined region of the image sensing element.

Further, the foregoing object is also attained by providing an image sensing apparatus comprising: an image sensing element which generates a signal upon receiving object light;

first and second clamp pulse generators adapted to generate clamp pulses used to clamp the signal output from the image sensing element; and a controller adapted to select and control one of the first and second clamp pulse generators in accordance with an amount of light which strikes a predetermined region of the image sensing element.

Further, the foregoing object is also attained by providing a method of controlling an image sensing apparatus having an image sensing element which generates a signal upon receiving object light, and first and second clamp pulse generators adapted to generate clamp pulses used to clamp the signal output from the image sensing element, comprising: selecting one of the first and second clamp pulse generators in accordance with an amount of light which strikes a predetermined region of the image sensing element; and controlling the selected one of the first and second clamp pulse generators.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a timing chart of an image sensing apparatus according to a first embodiment of the present invention;

FIG. 23 is a timing chart showing the OB level of the CDS output when charge signals have overflowed into the OB region.

DETAILED DESCRIPTION OF THE PREFERRED EMBODIMENTS

Preferred embodiments of the present invention will be described in detail in accordance with the accompanying drawings.

First Embodiment

Figure 1:
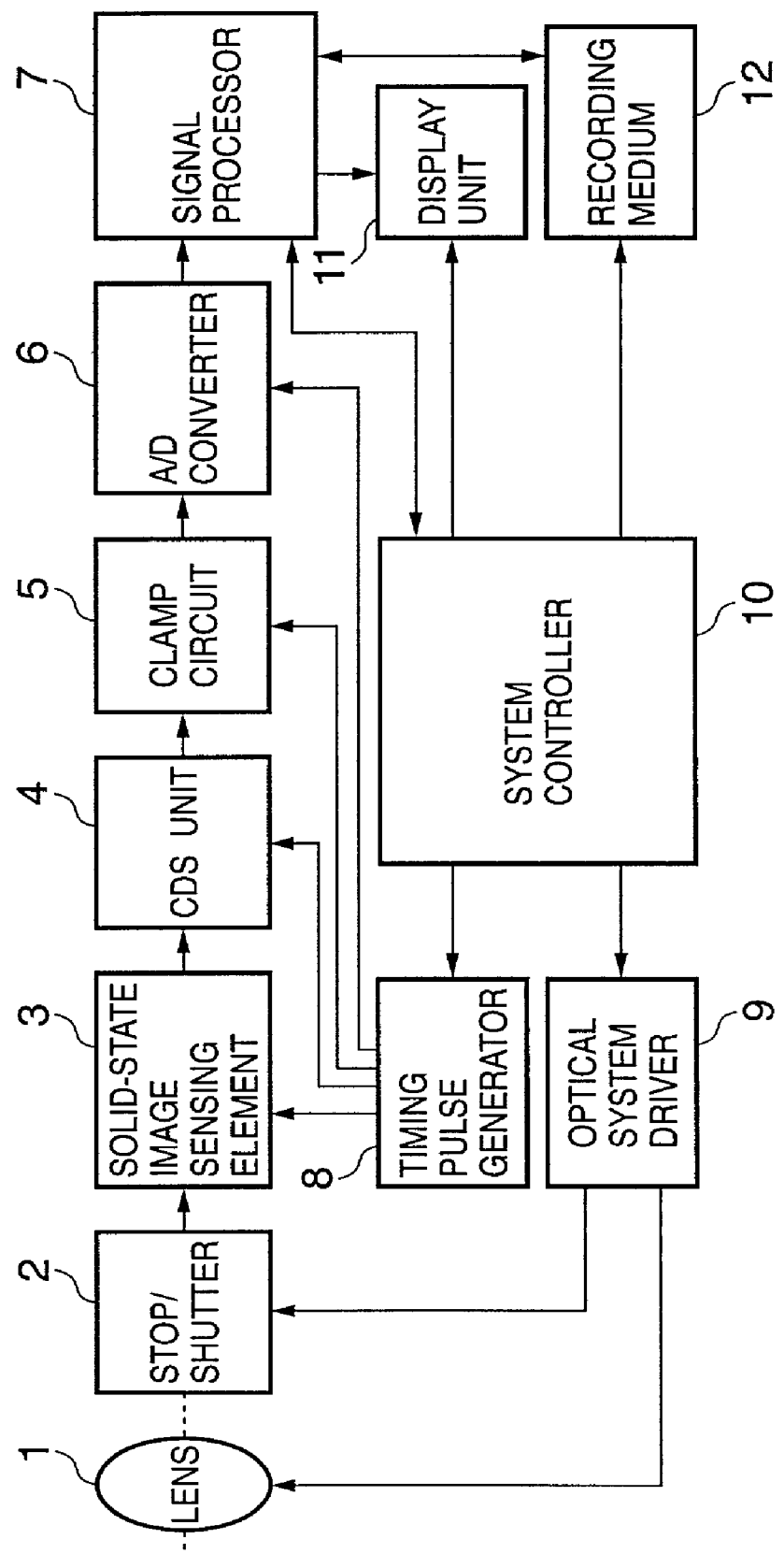
FIG. 1 is a block diagram showing the arrangement of an image sensing apparatus according to an embodiment of the present invention.

FIG. 1 shows the arrangement of an image sensing apparatus of this embodiment. Referring to FIG. 1, reference numeral 1 denotes a lens which forms an optical image of an object on a solid-state image sensing element 3. Reference numeral 2 denotes a stop/shutter which has a shutter function and also serves as a stop for controlling the amount of light that has passed through the lens 1. Reference numeral 3 denotes a solid-state image sensing element for capturing object light formed by the lens 1 and outputting an electrical signal. The solid-state image sensing element 3 has the same structure as that of the solid-state image sensing element 13 shown in FIGS. 20A and 20B. Reference numeral 4 denotes a CDS unit for performing correlated double sampling that removes clocks and reduces noise from an electrical signal output from the solid-state image sensing element 3. Reference numeral 5 denotes a clamp circuit for clamping an output from an optical black (OB) portion corresponding to an optical black level of light-shielded pixels of the solid-state image sensing element 3 to a predetermined reference voltage in response to a clamp pulse signal generated by a timing pulse generator 8 (will be explained later). Reference numeral 6 denotes an A/D converter for converting an output signal from the clamp circuit 5 from an analog signal into a digital signal.

Reference numeral 7 denotes a signal processor for executing various signal processes and conversions to obtain a signal of desired display or recording format. Reference numeral 8 denotes a timing pulse generator for generating and supplying required pulse signals to the solid-state image sensing element 3, CDS unit 4, clamp circuit 5, and A/D converter 6. Reference numeral 9 denotes an optical system driver for driving the lens 1, and stop/shutter 2. Reference numeral 10 denotes a system controller for making control and various arithmetic operations of the overall image sensing apparatus. Reference numeral 11 denotes a display unit for receiving a signal from the signal processor 7, and displaying the received signal on, e.g., an LCD. Reference numeral 12 denotes a detachable recording medium such as a semiconductor memory or the like on or from which image data is recorded or read out.

Figure 2A:
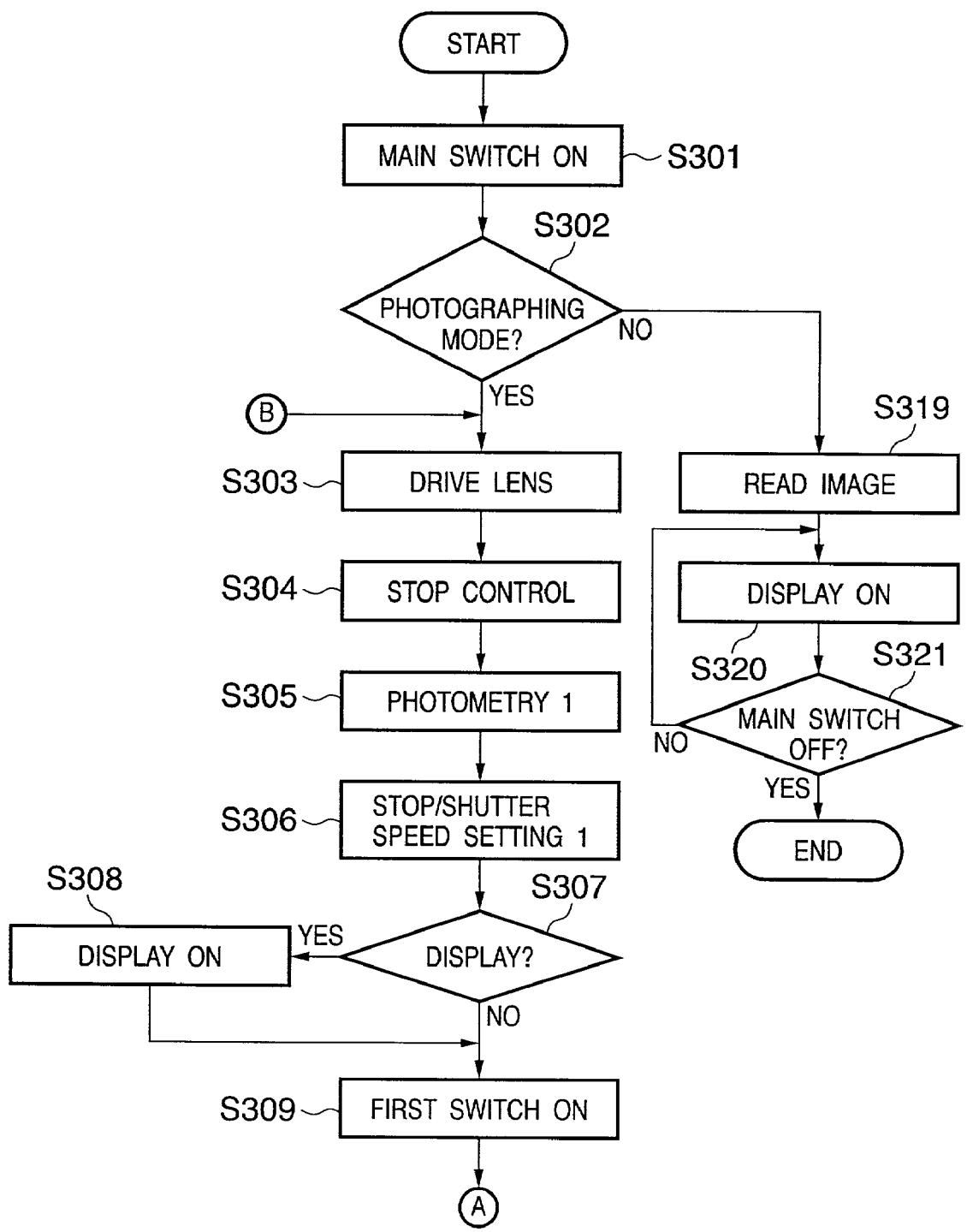
FIGS. 2A and 2B are flow charts showing the basic operation of the image sensing apparatus according to the embodiment of the present invention.
Figure 2B:
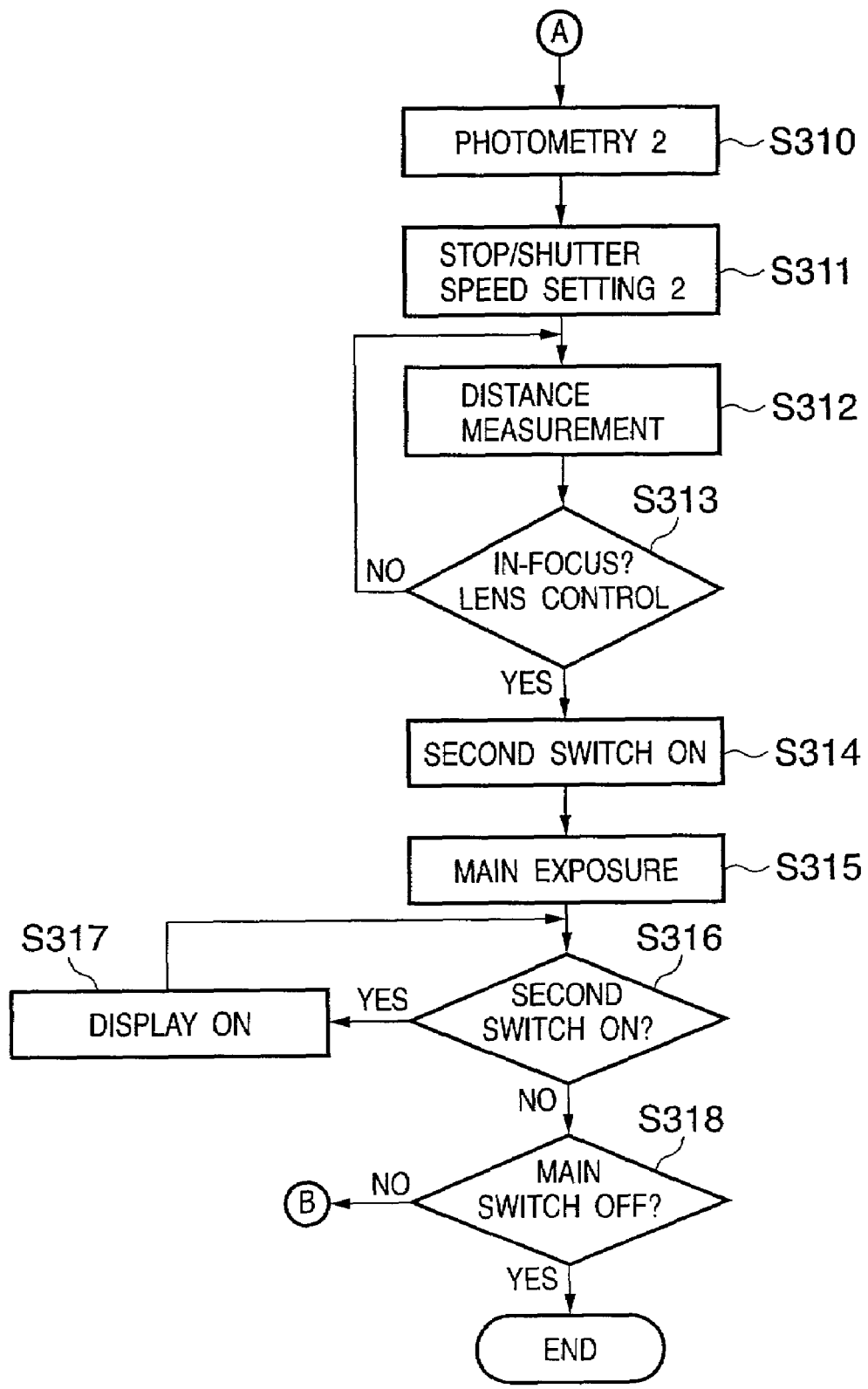

The basic operation of the image sensing apparatus of this embodiment will be explained below with reference to the flow chart in FIGS. 2A and 2B. If a main switch has been turned on (step S301), the image sensing apparatus turns on a main power supply and a power supply of a control system. It is then checked if a mode is a photographing or play mode (step S302). If the photographing mode is selected, the apparatus enters a photographing sequence. If the play mode is selected, the apparatus enters a play sequence, temporarily fetches data from the recording medium 12 into the signal processor 7 (step S319) to execute a signal process for display, and displays an image on, e.g., an LCD (step S320). After that, the apparatus displays the image until the main switch is turned off. If the main switch has been turned off (step S321), the apparatus cancels image display, and turns off the power supplies.

If it is determined in step S302 that the apparatus enters the photographing sequence, the apparatus drives an AF lens to a reset position (step S303), and turns on the power supply to an image sensing system circuit including the solid-state image sensing element 3, timing pulse generator 7, and the like. The stop/shutter 2 is opened in response to a signal from the optical system driver 9 under the control of the system controller 10 (step S304). After that, signals obtained from the solid-state image sensing element 3 undergo correlated double sampling by the CDS unit 4, and an OB portion is clamped by the clamp circuit 5 and is A/D-converted by the A/D converter 6. The image data obtained by the conversion is processed by the signal processor 7, and is input to the system controller 10, which makes an arithmetic operation to obtain an exposure control value based on a photometry value (step S305). The system controller 10 determines and controls an aperture value and shutter speed using a chart in accordance with the arithmetic operation result (step S306).

Then, the apparatus confirms the display mode (step S307). If a display ON mode is selected, the apparatus makes display on, e.g., the LCD or the like (step S308); otherwise, the apparatus stands by until a first switch of a release switch is turned on. If the first switch has been turned on (step S309), the apparatus makes photometry and arithmetic operation again (step S310), and the system controller 10 determines and controls the aperture value and shutter speed again using the chart in accordance with the arithmetic operation result (step S311).

The signal processor 7 then extracts high-frequency components from image data obtained via the solid-state image sensing element 3, CDS unit 4, clamp circuit 5, and A/D converter 6, and the system controller 10 calculates the distance to an object (step S312). After that, the apparatus drives the lens and checks if an in-focus state is attained (step S313). If it is determined that an in-focus state is not attained, the apparatus drives the lens and measures the distance to an object again.

After an in-focus state is attained, the apparatus waits until a second switch is turned on. If the second switch has been turned on (step S314), the apparatus makes exposure for photographing a still image (step S315). Upon completion of exposure, image data obtained via the solid-state image sensing element 3, CDS unit 4, clamp circuit 5, and A/D converter 6 undergoes a desired signal process by the signal processor 7, and the processed image data is recorded on the recording medium 12 under the control of the system controller 10.

At this time, if the second switch is kept ON (step S316), an image is kept displayed on the LCD or the like (step S317) until the second switch is released. If the second switch is turned off, the apparatus stops display, and ends the photographing process. In step S316, if the display mode is OFF, the photographing process ends without display.

If the main switch is kept ON (step S318), the flow returns to step S303 to repeat the sequence until the first switch of the release switch is pressed, and the apparatus waits until the first switch of the release switch is turned on. If the main switch is turned off, respective mechanisms of the optical system return to predetermined positions, and the main power supply is turned off.

The operation of the image sensing apparatus in the first embodiment will be described below with reference to the timing chart in FIG. 3 and the block diagram of FIG. 4 that shows the arrangement from the solid-state image sensing element 3 to the clamp circuit 5 and the arrangement of the timing pulse generator 8.

Referring to FIG. 3, VD and HD respectively represent vertical and horizontal sync signals, which are sync pulse signals that define the basic timings of a photographing system in blocks from the solid-state image sensing element 3 to the signal processor 7.

$\phi V1$ and $\phi V3$ represent some of vertical transfer pulse signals $\phi V1$ to $\phi V4$ (see FIG. 20B), which are used to transfer charge signals in vertical transfer registers that form the solid-state image sensing element 3, and which have read pulses for shifting charge signals from photodiodes 113 and 114 of the solid-state image sensing element 3 to the vertical transfer registers 115. MASK represents a mask signal which masks a read signal used to generate $\phi V1$ and $\phi V3$ when it is added to V1 and V3 in FIG. 4. SUB represents a pulse signal for controlling exposure by draining charge signals from the photodiodes 113 and 114 in the substrate direction.

SHUTTER represents the open/close state of the stop/shutter 2. CPOB represents a clamp pulse signal output from the timing pulse generator 8 to clamp an optical black level signal obtained by reading out pixels of an OB region 112. SOLID-STATE IMAGE SENSING ELEMENT OUTPUT represents an output signal from the solid-state image sensing element 3. OB LEVEL OF CDS OUTPUT represents the signal level of the OB region 112 of the output signals from the CDS unit 4.

Figure 4:
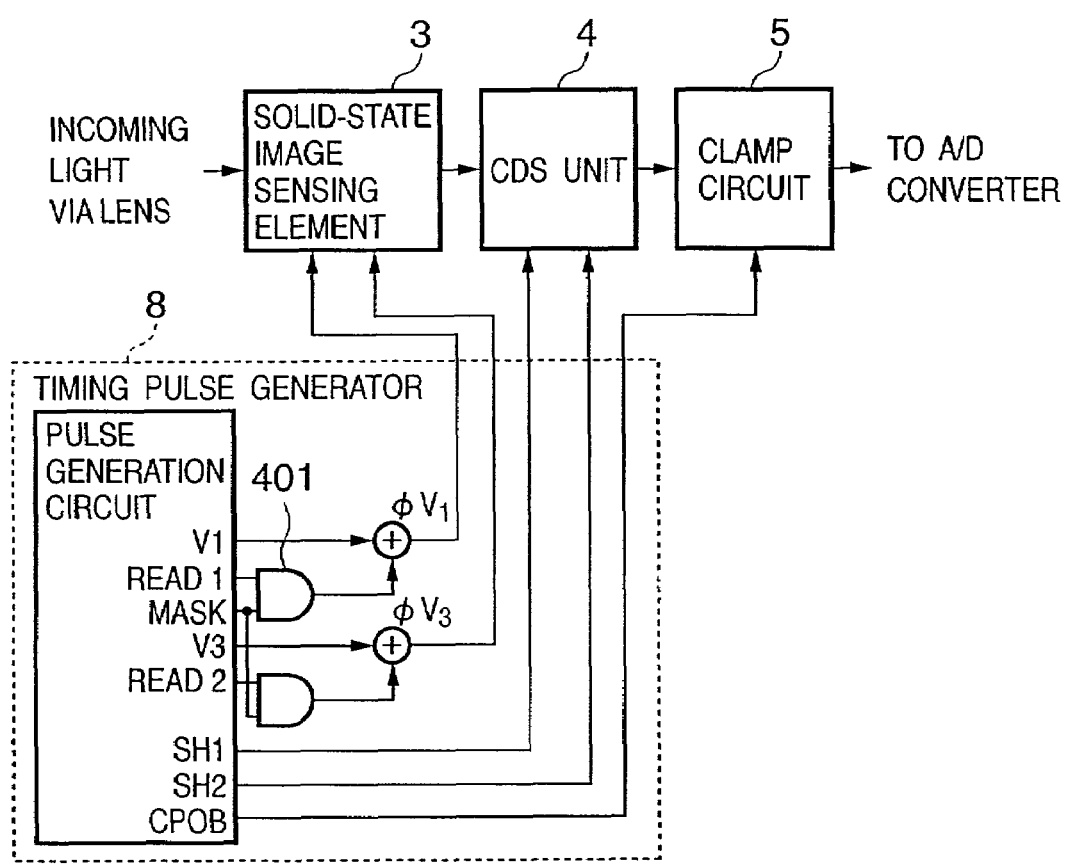
FIG. 4 is a block diagram showing the arrangement from a solid state image sensing element to a clamp circuit, and the arrangement of a timing pulse generator according to the first embodiment of the present invention.

Also, $\Phi V1$ and $\Phi V3$ represent signals as the sums of V1 and V3, and signals obtained by AND operation (through And Gate 401) of read pulses 1 and 2 and the mask signal, as shown in FIG. 4. These signals $\Phi V1$ and $\Phi V3$ are output to the solid-state image sensing element 3. SH1 and SH2 represent pulse signals used to perform correlated double sampling in the CDS unit 4. The sample/hold pulse signal SH1 is used to sample and hold the reset level, and the sample/hold pulse signal SH2 is used to sample and hold the signal level.

In the timing chart of FIG. 3, when very intense light such as spot light, sunlight, or the like becomes incident on the solid-state image sensing element 3 at certain time t1 at which exposure and charge read of the solid-state image sensing element 3 are continuously repeated, charge signals generated on an effective pixel region 111 overflow and reach the vertical transfer registers 115 and a horizontal transfer register 116, and many charge signals are transferred even during a charge transfer period corresponding to the OB region 112 in which nearly no charge signals are supposed to be transferred, i.e., an OB period. Hence, the OB level of the CDS output becomes higher than a proper black level, as shown in FIG. 3.

If the second switch of the release switch has been pressed at time t2, preparation for exposure for photographing a still image (e.g., to change the driving mode of the solid-state image sensing element 3) is made. After that, exposure starts from time t3 at which the last SUB pulse for draining charge signals of the photodiodes in the substrate direction is output, and it ends at time t4 at which the mechanical shutter is completely closed. That is, an interval from time t3 to time t4 is an exposure period of the still image photographing process. In FIG. 3, a period in which SHUTTER is LOW indicates that the mechanical shutter is closed.

Upon completion of exposure of a still image, the MASK signal for masking read pulses 1 and 2 changes from HIGH to LOW. As shown in FIG. 4, when the MASK signal changes to LOW, since read pulses 1 and 2 are ANDed with the MASK signal, the AND output changes to LOW, and no read pulses appear in φV1 and φV3. For this reason, charge signals accumulated during the still image exposure period from time t3 to time t4 are not shifted from the photodiodes to the vertical transfer registers. Hence, only charge signals which remain in the vertical and horizontal transfer registers 115 and 116 are transferred during a period from time t5 to time t6. This operation is called "idle read".

In this way, it is important not to read charge signals accumulated during the still image exposure period from the photodiodes, and but to transfer only charge signals which remain in the vertical and horizontal transfer registers 115 and 116. When intense light has entered, all charge signals that overflow into the vertical and horizontal transfer registers 115 and 116 and the OB region 112 may not be completely discarded during the high-speed sweep-away period before time t5 during which charges are transferred at a higher speed than a speed for reading a still image, and may remain. Hence, when charge signals in the vertical and horizontal transfer registers 115 and 116 are transferred during this idle period, unnecessary remaining charge signals can be discarded.

Originally, a high-speed sweep-away period for quickly discarding charge signals at higher charge transfer speed than transfer speed used during a still image reading period is present like a period from time t6 to time 7 for the same purpose as above. However, when really intense light has become incident on the solid-state image sensing element 3, this high-speed sweep-away period does not suffice to discard all overflow charge signals. From this respect, the idle read transfer period from time t5 to time t6 is important, and has a great effect to sweep away needless charge signals.

The duration of this idle read period can be arbitrarily set by controlling the timing pulse generator 8 by the system controller 10. For example, the idle read time may have the same duration as that when exposure and charge read are continuously repeated, i.e., upon sensing a moving image, or may have the same duration as the read period of a still image. Or the idle read period may have an arbitrary duration. In general, the idle read period preferably has a shortest duration within which the sweep-away effect is expected, so as to reduce any release time lag of the image sensing apparatus.

Alternatively, idle reading may be repeated a plurality of times at a higher charge transfer speed than a transfer speed for reading a still image during the high-speed sweep-away period. This operation can omit the idle read period while gaining an effect of discarding needless charges.

After the idle read period, the OB portion to be read has no charge signals, and the OB level of the CDS output returns to a proper black level, as shown in FIG. 3. As a result, the clamp circuit 5 can clamp a proper black level, and the A/D converter 6 and signal processor 7 can execute processes at a proper signal level, thus obtaining a desired image.

In this way, by assuring the idle read period (from time t5 to time t6), the level of the OB region 112 can be recovered.

After the idle read period, the MASK signal that masks the read pulses changes from LOW to HIGH at time t6 to shift charge signals, which have remained accumulated on the photodiodes 113 and 114 of the solid-state image sensing element 3 during a period from time t4 to time t7, to the vertical transfer registers 115, and these charge signals are sequentially transferred in response to vertical and horizontal transfer pulse signals VD and HD during a period up to time t8, thereby reading charge signals of a still image.

The read signals undergo processes from the CDS unit 4 to the signal processor 7, and are finally recorded on the recording medium 12. The mechanical shutter is opened again at time t9, and if the mode of displaying an image on the display unit 11, such as LCD, is selected, an image is displayed to prepare for the next exposure of a still image.

As described above, according to the first embodiment, the signal level of the OB region can be recovered before the beginning of an image signal read process, using a proper clamp time constant which is effective to reduce stripe-like noise, without generating stripe-like noise due to a small clamp time constant, which is set to assure high clamp response speed, thus obtaining a desired image. Also, since the idle read process can be implemented without modifying any circuits, an advantage in terms of cost can be provided.

Second Embodiment

The second embodiment will be described below with reference to FIGS. 5 to 7. Note that the basic arrangement and operation of the image sensing apparatus are the same as those described above with reference to FIGS. 1 and 2, and a description thereof will be omitted. Also, the solid-state image sensing element 3 has the same structure as that shown in FIGS. 20A and 20B. Furthermore, since the timing chart is substantially the same as that explained with reference to FIG. 3 except for the OB level of the CDS output (see FIG. 6), a detailed description using the timing chart of FIG. 3 will be omitted.

Figure 5:
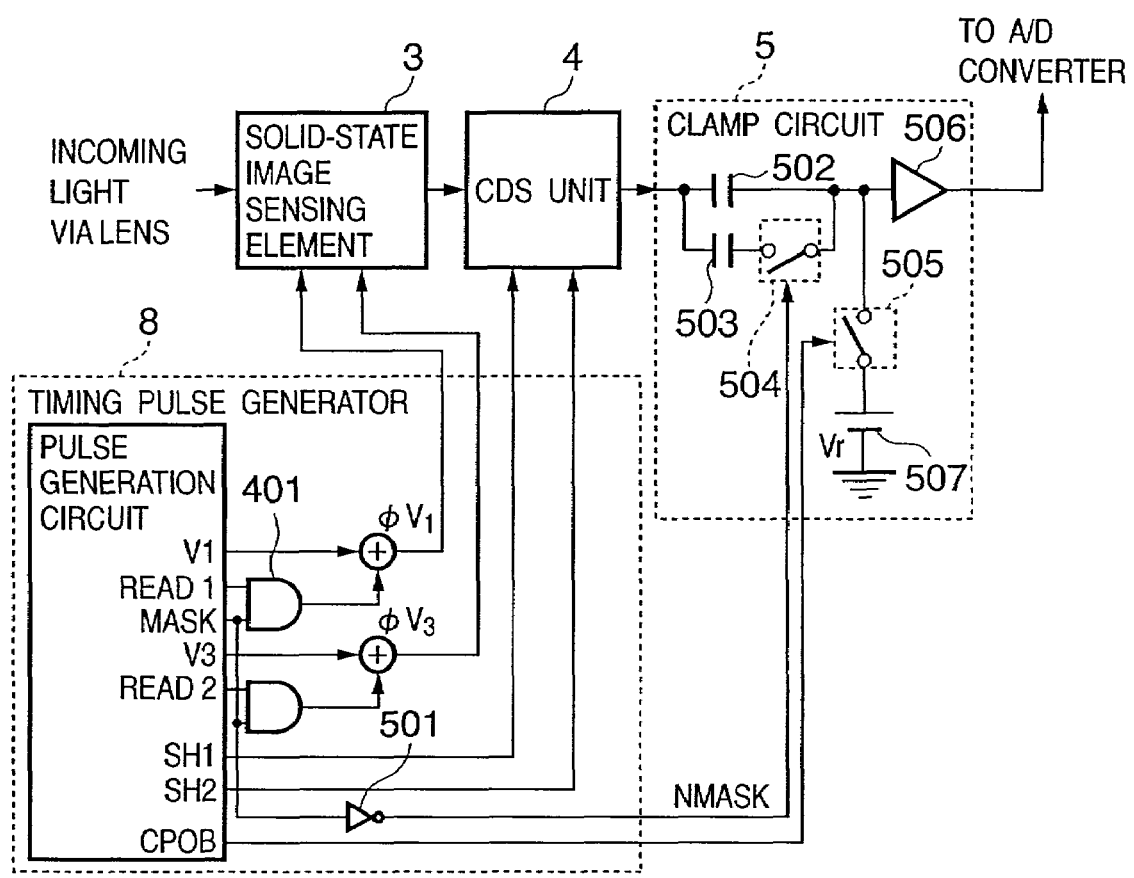
FIG. 5 is a block diagram showing the arrangement from a solid-state image sensing element to a clamp circuit, and the arrangement of a timing pulse generator according to a second embodiment of the present invention.

As shown in FIG. 5, in the image sensing apparatus in the second embodiment, the clamp circuit 5 and timing pulse generator 8 in the arrangement of the image sensing apparatus described in the first embodiment comprise switches used to change the clamp time constant during the idle read period, and these switches are controlled by pulses.

An inverter 501 inverts the polarity of the MASK signal used to mask read pulse 1 or 2. Capacitors 502 and 503 determine the clamp time constant of the clamp circuit, i.e., the sum of the capacitances of the capacitors 502 and 503 defines the time constant. The capacitor 502 is connected to an amplifier 506, and the capacitor 503 is connected to the amplifier 506 parallel to the capacitor 502 via a switch 504. The switch 504 and a switch 505 are turned on during a period in which a control signal is LOW, and are respectively controlled by the inverted pulse signal of the MASK signal and clamp pulse signal CPOB. One electrode of the switch 505 is connected to the amplifier 506, and the other electrode is connected to a reference voltage supply 507 which supplies a reference voltage for clamp.

Figure 6:
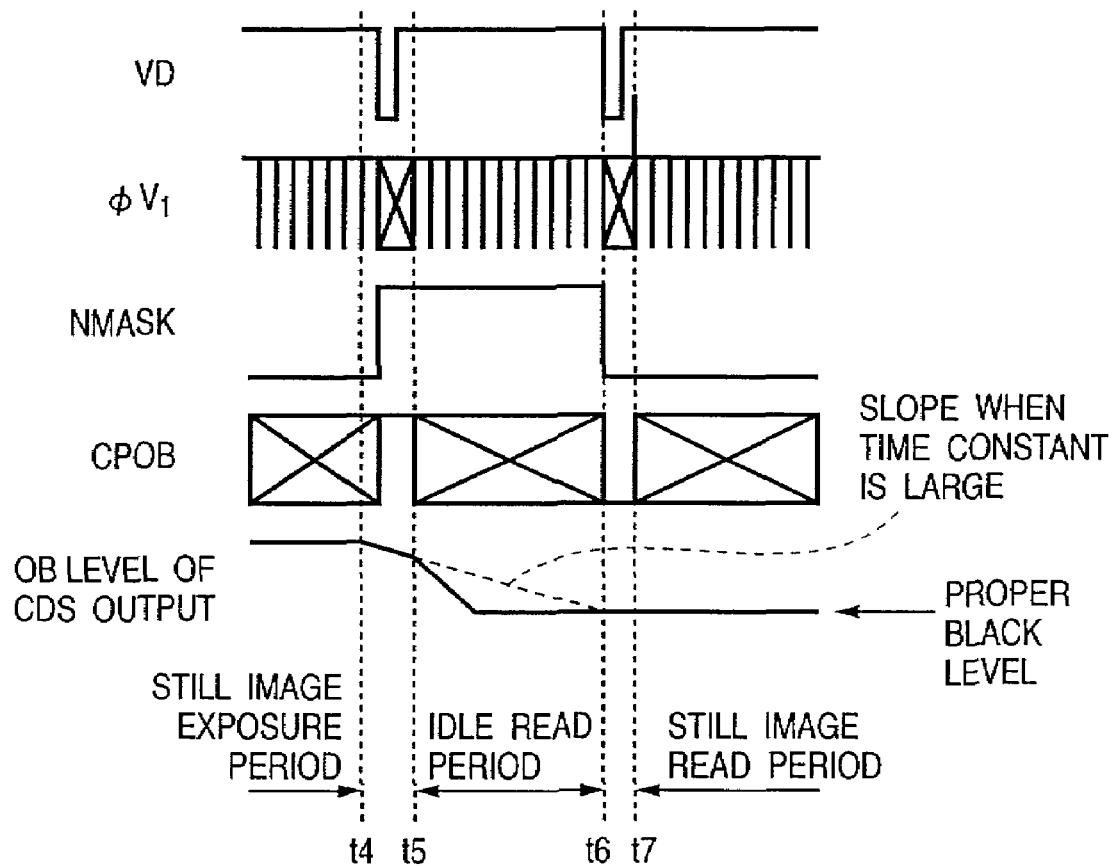
FIG. 6 is a timing chart showing a period from time t4 to time t7 according to the second embodiment of the present invention.
Figure 7:
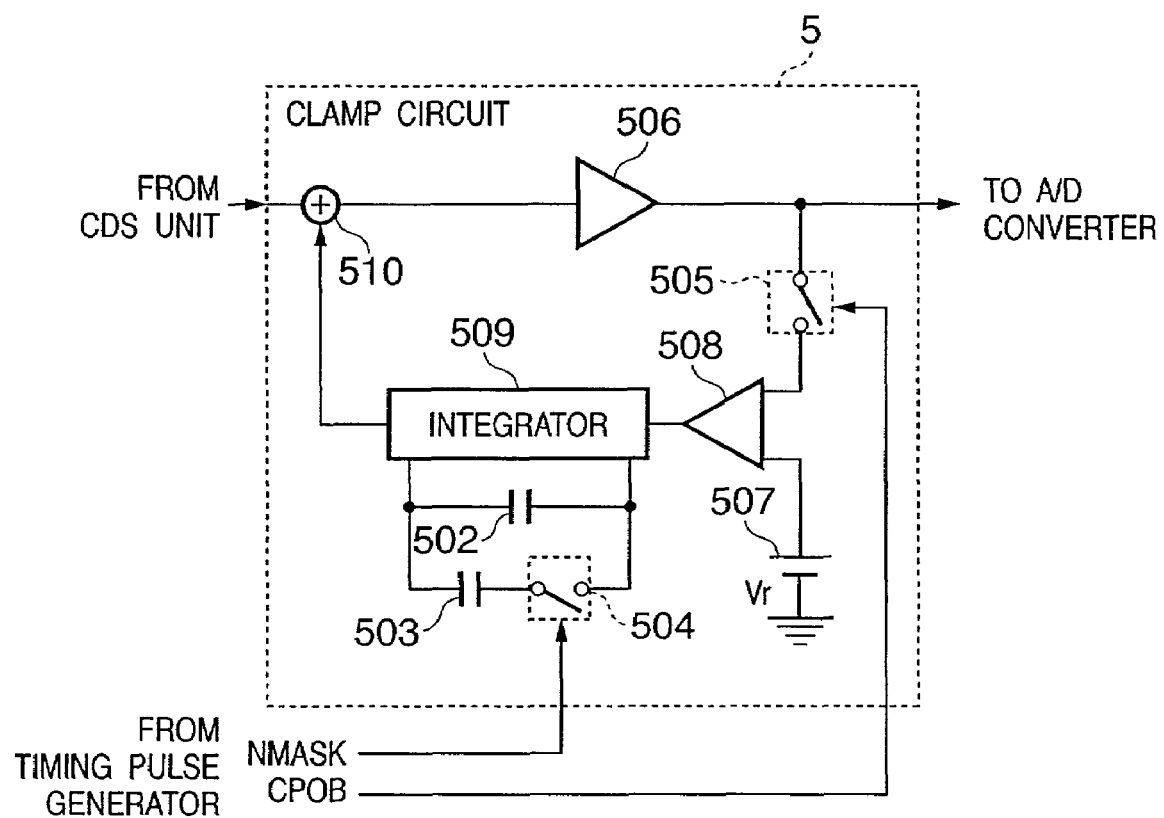
FIG. 7 is a block diagram showing the arrangement of a feedback clamp circuit according to a modification of the second embodiment of the present invention.

FIG. 6 shows a period corresponding to that from time t4 to time t7 in the timing chart shown in FIG. 3. Note that the processes before time t4 and after time t7 in FIG. 3 are the same as those in the first embodiment, and a description thereof will be omitted. Upon completion of a still image exposure period at time t4, the MASK signal that masks a read pulse changes from HIGH to LOW, and no read pulses appear in φV1 and φV3 at time t5. Charge signals for exposure of a still image, which are accumulated on the photodiodes 113 and 114 of the solid-state image sensing element 3, remain accumulated on the photodiodes 113 and 114 until the next read pulses are output.

At this time, the MASK signal is also input to the inverter 501, and its polarity is inverted to obtain an NMASK signal. The NMASK signal controls the switch 504 of the clamp circuit 5 and goes HIGH during a 1V period from time t4 to time t6 that includes an idle read period, thus opening the switch 504. As a result, since the connection of the capacitor 503 of the parallel circuit of the capacitors 502 and 503 is opened, and the total capacitance of the capacitor decreases, the time constant of the clamp circuit decreases. Therefore, the OB level of the CDS output during the idle read period from time t5 to time t6 converges to a proper black level quicker than when the time constant of the clamp circuit 5 is large.

At time t6, the NMASK signal changes to LOW to short-circuit the switch 504, and the clamp time constant is restored to an original value. During a still image read period after time t7, a signal can be clamped using a large clamp time constant which is effective to reduce stripe-like noise.

That is, by switching the clamp constant using the switch 504, a large clamp time constant, which is effective to reduce stripe-like noise and does not influence image quality, can be used during the image read period, and a small clamp time constant, which can restore the OB level of the CDS output quickly to a proper black level, can be used during the idle read period. Furthermore, if the idle read period can be set arbitrarily, this period can be effectively shortened, and the processing time of the overall image sensing apparatus can be shortened. Hence, the effect of shortening the shutter time lag can be consequently obtained.

Modification of the Second Embodiment

Another arrangement of the clamp circuit 5 will be explained below with reference to FIG. 7. Note that the same reference numerals in FIG. 7 denote components having the same functions as those in FIG. 5. This clamp circuit 5 has the amplifier 506, the input of which receives the output from the CDS unit 4, and which outputs an amplified video signal. The output of the amplifier 506 is connected to the A/D converter 6, and is also input to one electrode of the switch 505, which is controlled by a clamp pulse signal CPOB. The other electrode of the switch 505 is connected to a differential amplifier 508. The other input terminal of the differential amplifier 508 is connected to the reference voltage supply 507 for generating a reference voltage Vr, and the differential amplifier 508 generates an output corresponding to the difference between the amplifier 506 and reference voltage source 507. This output is input to an integrator 509. The capacitors 502 and 503 determine the time constant for integration by the integrator 509. One electrode of the capacitor 503 is connected to the switch 504, which is controlled by the NMASK signal, and controls connection/disconnection of the capacitor 503 to/from the integrator 509. Furthermore, the output of the integrator 509 is connected to the amplifier 506 via an adder 510. With this arrangement, the differential amplifier 508 forms a feedback circuit of the amplifier 506.

The clamp circuit 5 of this type is a so-called feedback clamp circuit. In such a clamp circuit, the integration time constant, i.e., clamp response, can be changed by controlling connection of the capacitor 503 by the switch 504. Therefore, as in the arrangement shown in FIG. 5, a large clamp time constant, which is effective to reduce stripe-like noise and does not influence image quality, can be used during the image read period, and a small clamp time constant, which can restore the OB level of the CDS output quickly to a proper black level can be used during the idle read period. Hence, the OB level of the CDS output can be quickly restored to a proper black level. That is, the method of setting a small clamp time constant to obtain short clamp response is effective independently of the type of clamp circuit.

Third Embodiment

The third embodiment of the present invention will be described below with reference to FIGS. 8 and 9. Note that the basic arrangement and operation of the image sensing apparatus are the same as those described above using FIGS. 1 and 2, and a description thereof will be omitted. Also, the solid-state image sensing element 3 has the same structure as that shown in FIGS. 20A and 20B. Furthermore, since the timing chart is substantially the same as that explained using FIG. 3 except for the OB level of the CDS output, a detailed description using the timing chart of FIG. 3 will be omitted. Furthermore, the timing chart is substantially the same as that in FIG. 6 except for NMASK described using FIG. 6, and a description thereof will be omitted.

Figure 8:
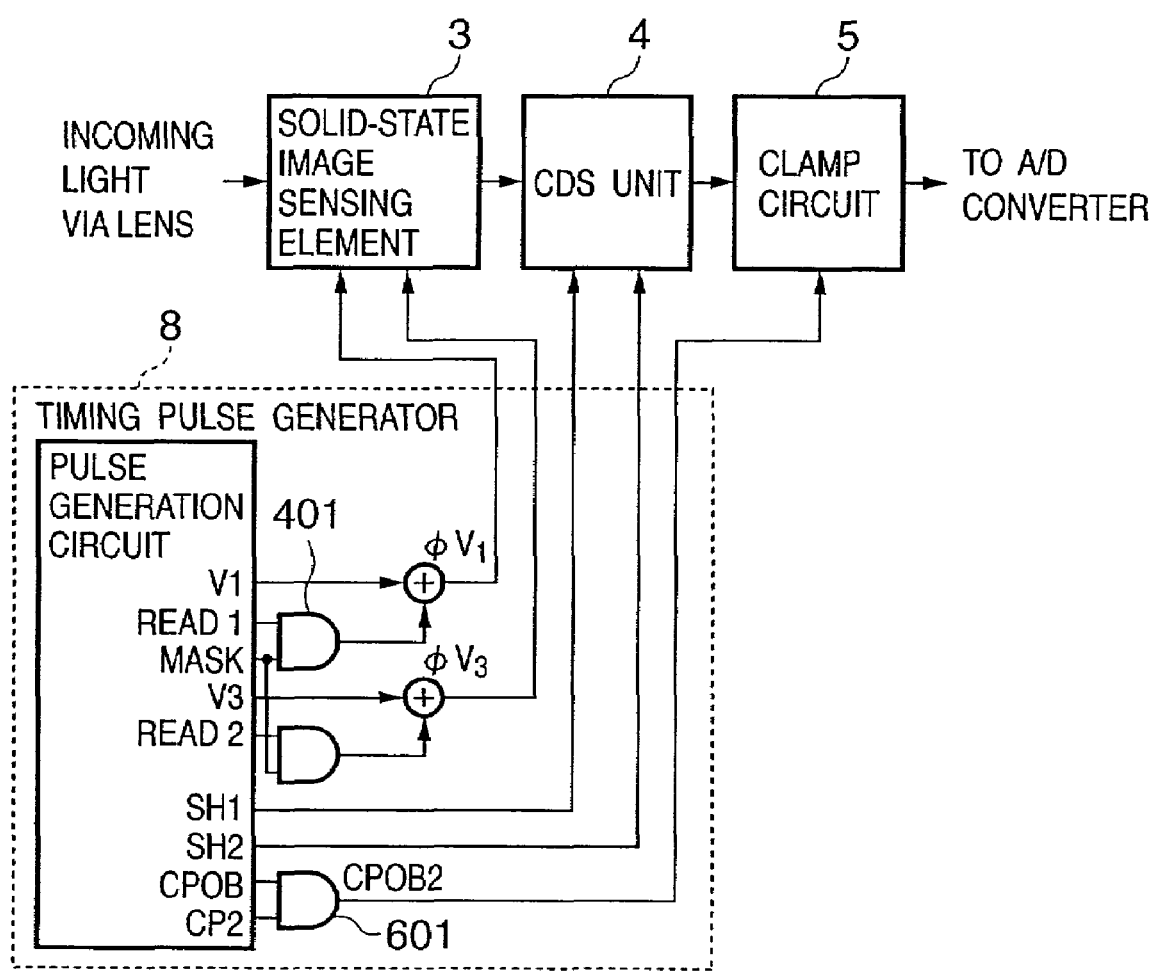
FIG. 8 is a block diagram showing the arrangement from a solid-state image sensing element to a clamp circuit, and the arrangement of a timing pulse generator according to a third embodiment of the present invention.

As shown in FIG. 8, in the image sensing apparatus of the third embodiment, the timing pulse generator 8 in the arrangement of the image sensing apparatus described in the first embodiment has a function of ANDing a conventional clamp pulse signal CPOB and another clamp pulse signal CP2 as a clamp pulse signal to the clamp circuit 5. As shown in FIG. 9, a pulse CP2 changes to LOW during a so-called dummy period between the horizontal blanking period and effective pixel period. The pulse CP2 is generated during only the idle read period, and is normally at HIGH level during a period except for the idle read period. During this dummy period, charge signals in a portion 118 that does not receive any charge signals from the vertical transfer registers 115 in the horizontal transfer register 116 are transferred (see FIG. 20B), and the level of these signals can be considered as a pseudo black level, although the level of those signals from the portion 118 does not exactly match a real optical black level.

An AND gate 601 inputs a pulse signal CPOB2 to the clamp circuit 5. Therefore, the clamp operation is done twice during the OB period and a pseudo OB period (dummy period) within one horizontal period.

Figure 9:
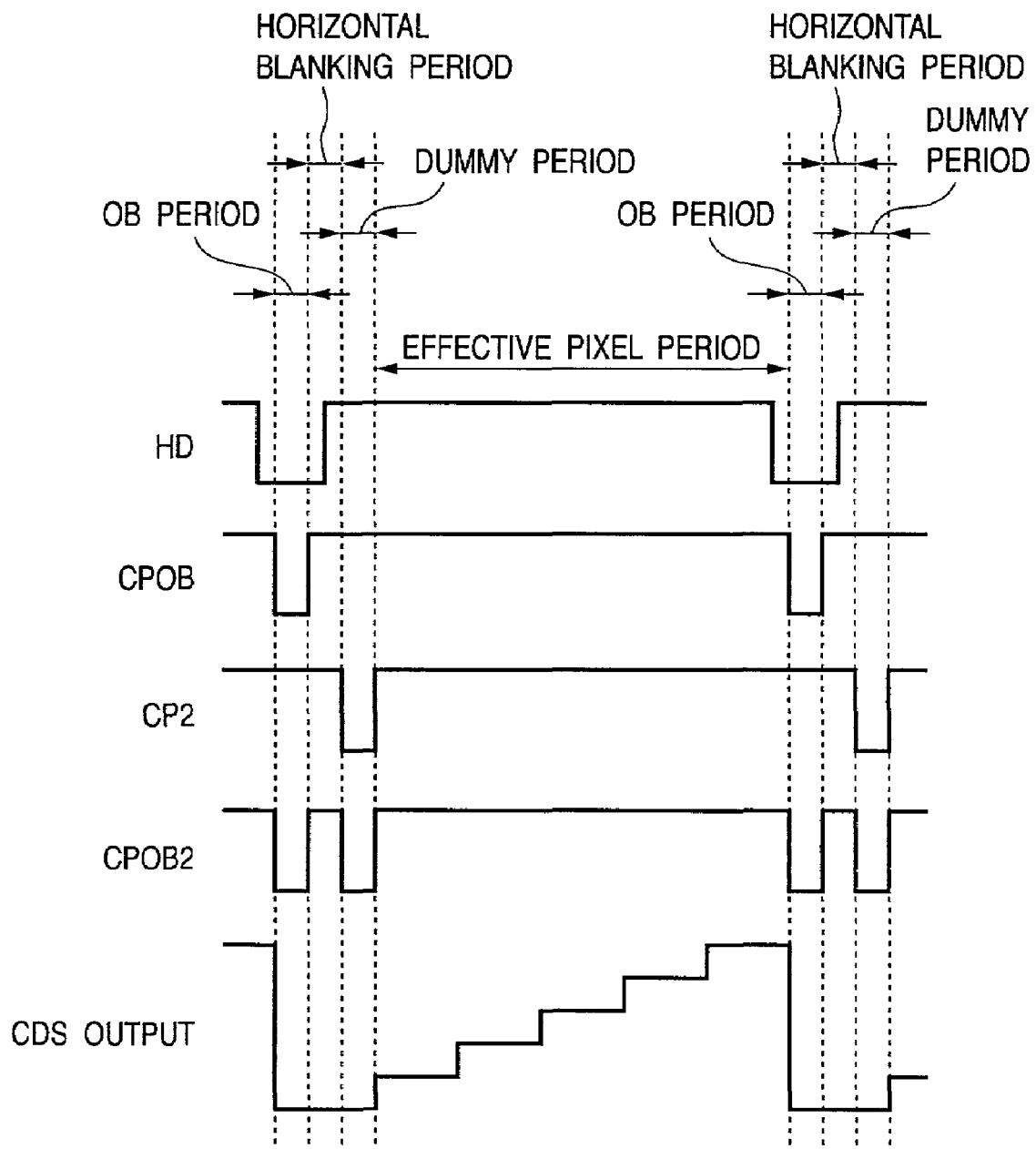
FIG. 9 is a timing chart of an image sensing apparatus according to the third embodiment of the present invention.

During a period from time t5 to time t6 in FIG. 6, since the pulse signal CPOB2 in FIG. 9 is input to the clamp circuit 5, the clamp operation is executed twice during one horizontal period. For this reason, the OB level of the CDS output during the idle read period from time t5 to time t6 can be quickly converted to a proper black level, as shown in FIG. 9.

At time t6, the pulse CP2 changes to normally HIGH, and the clamp pulse signal CPOB2 to the clamp circuit 5 returns to the same waveform as CPOB. Therefore, original clamp pulses can be used during the still image read period after time t7.

That is, by restoring the clamp pulse signal to CPOB, a proper black level can be clamped during a period wherein exposure and read are continuously repeated or during a still image read period, and the dummy period of a pseudo black level which does not exactly match an optical black level is also clamped during the idle read period, thus quickly restoring the OB level of the CDS output to a proper black level. Furthermore, if the idle read period can be set arbitrarily, this period can be effectively shortened, and the processing time of the overall image sensing apparatus can be shortened. Hence, the effect of shortening any shutter time lag can be consequently obtained. Furthermore, the third embodiment can be implemented by only pulse control without changing the circuit arrangement, i.e., without requiring any extra cost.

Fourth Embodiment

The operation of the fourth embodiment of the present invention will be described below. Note that the basic arrangement and operation of the image sensing apparatus are the same as those described above with reference to FIGS. 1 and 2, and a description thereof will be omitted. Also, the solid-state image sensing element 3 has the same structure as that shown in FIGS. 20A and 20B. Furthermore, since the timing chart is substantially the same as that explained using FIG. 3 except for CPOB and the OB level of the CDS output, a detailed description using the timing chart of FIG. 3 will be omitted.

Figure 10:
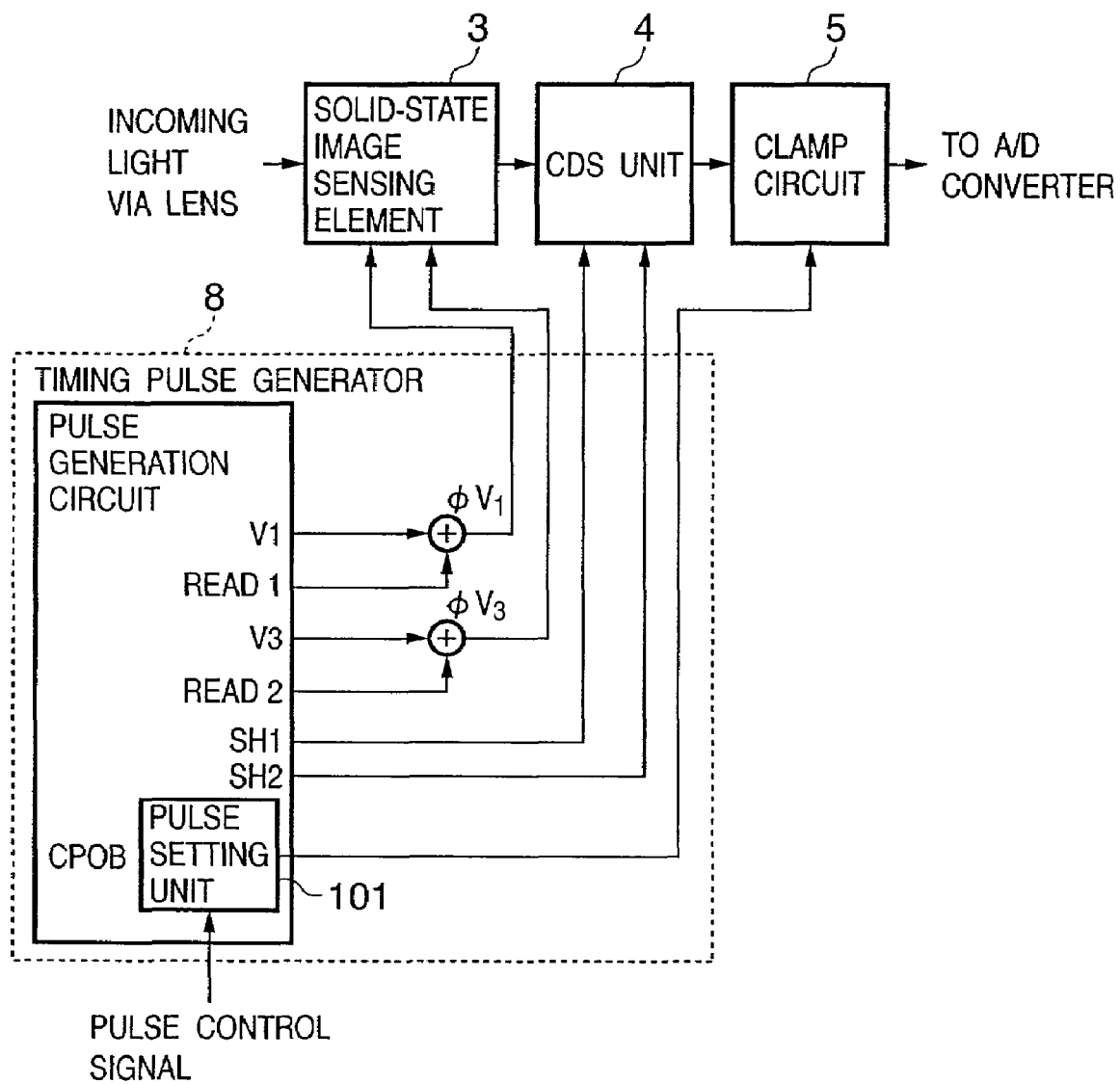
FIG. 10 is a block diagram showing the arrangement from a solid-state image sensing element to a clamp circuit, and the arrangement of a timing pulse generator according to a fourth embodiment of the present invention.
Figure 11:
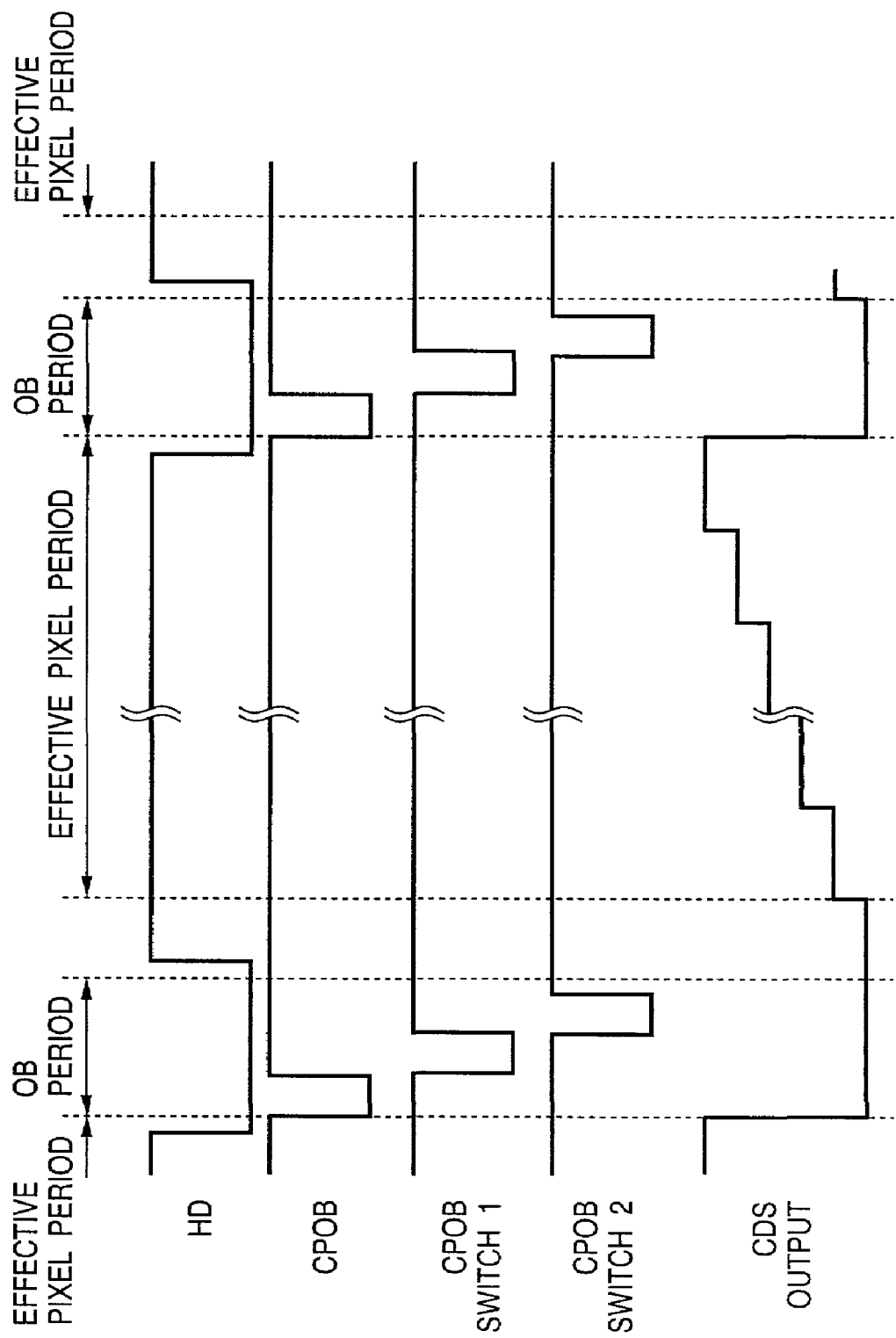
FIG. 11 is a timing chart of an image sensing apparatus according to the fourth embodiment of the present invention.
Figure 12:
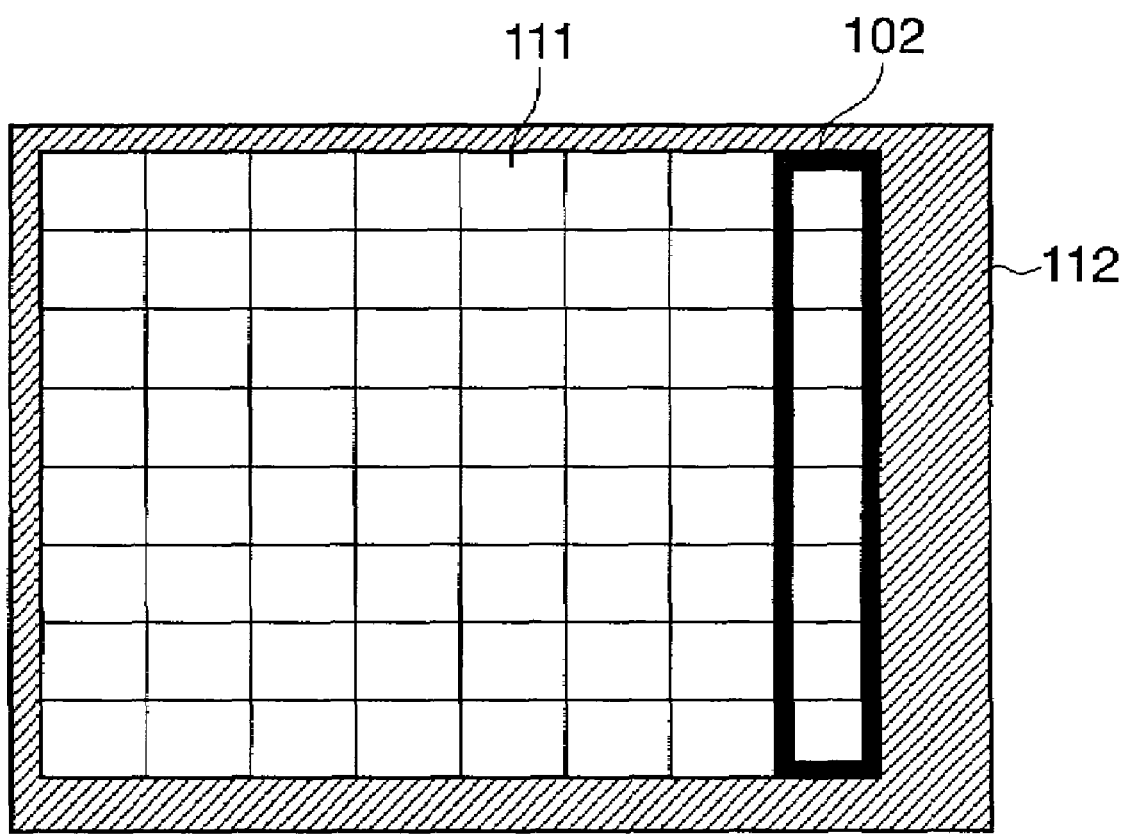
FIG. 12 shows a photometry region according to the fourth embodiment of the present invention.

FIG. 10 is a block diagram showing the arrangement from the solid state image sensing element 3 to the clamp circuit 5 and the arrangement of the timing pulse generator 8 in the fourth embodiment of the present invention, FIG. 11 is a timing chart of the image sensing element, FIG. 12 shows the photometry region of the image sensing element 3, and FIG. 3 is a flow chart of a photometry sequence.

Referring to FIG. 10, $\phi V1$ and $\phi V3$ represent vertical transfer pulse signals obtained by adding read pulses 1 and 2 to V1 and V3, as shown in FIG. 10, and these pulse signals are output to the solid-state image sensing element 3. SH1 and SH2 represent pulse signals used in correlated double sampling of the CDS unit 4. That is, the sample/hold pulse signal SH1 is used to sample and hold the reset level, and the sample/hold pulse signal SH2 is used to sample and hold the signal level. Reference numeral 101 denotes a pulse setting unit for setting the clamp pulse signal CPOB to be output to the clamp circuit 5. The pulse setting unit 101 is controlled by a pulse control signal from the system controller 10. CPOB represents a pulse signal which changes to LOW during a predetermined period within the OB period, as shown in FIG. 11, and is used to clamp an OB portion of the CDS output.

FIG. 12 shows segmented photometry regions on the solid-state image sensing element in a photometry process. The effective pixel region 111 is broken up into a total of 64 (=8 rows×8 columns) photometry regions, and values according to the amounts of light from these photometry regions are obtained as photometry values. Note that the 8×8 photometry regions 111 are merely an example, and the present invention is not limited to such specific number of segmented regions. For example, the region may be segmented into more than or less than 8 regions in each direction, and the numbers of segmented regions in the vertical and horizontal directions need not be equal to each other. In general, the degree of freedom in processing increases with increasing number of segmented photometry regions.

Reference numeral 102 denotes eight photometry regions for one column, which neighbor the OB region 112 (read out during the OB period shown in FIG. 11) at the end of the horizontal period.

Figure 13:
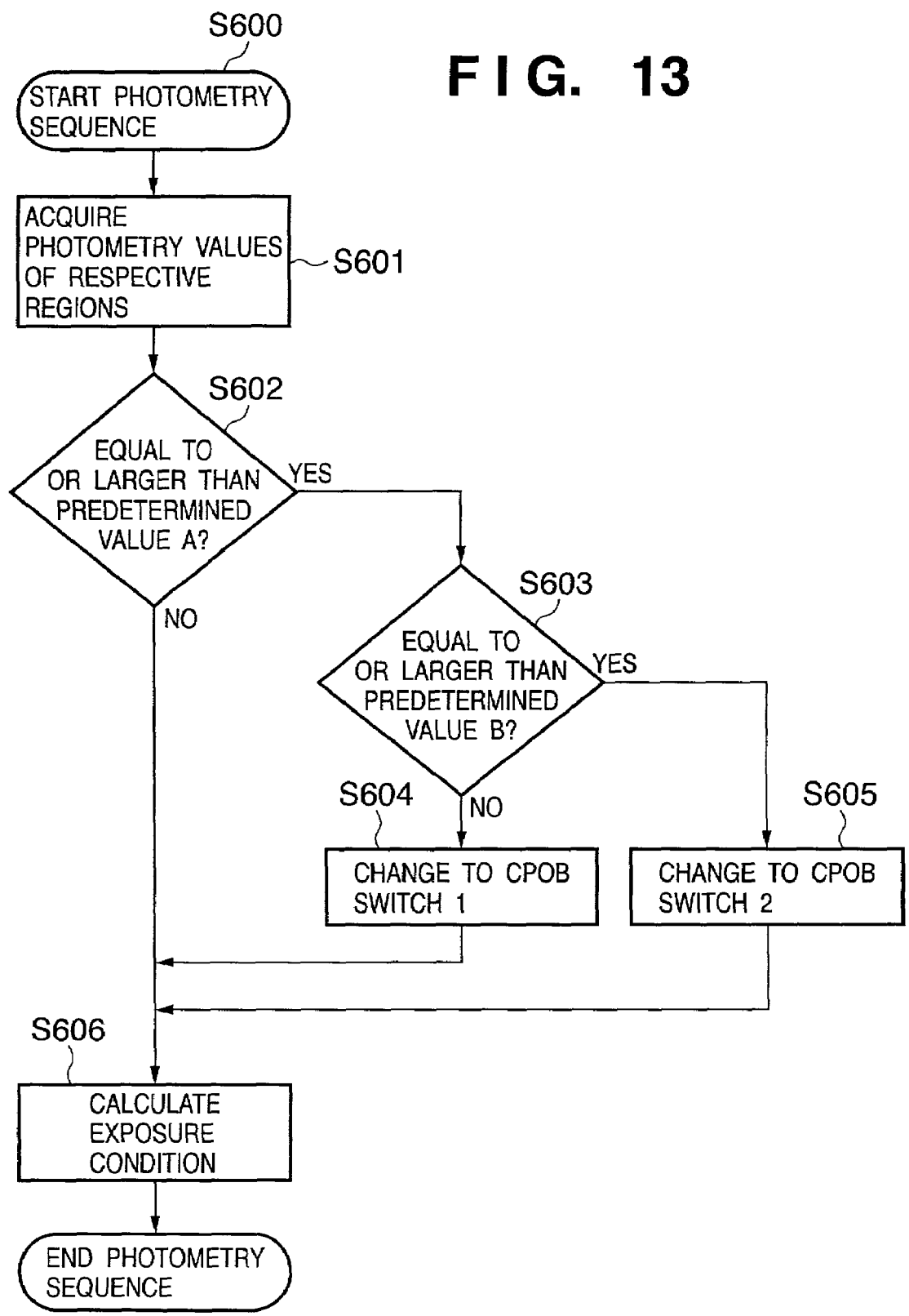
FIG. 13 is a flow chart of a photometry sequence according to the fourth embodiment of the present invention.

The following explanation will be given with reference to the flow chart of the photometry sequence in FIG. 13. When the photometry sequence starts, object light that has entered via the lens is received by the solid-state image sensing element 3, and its output signal undergoes correlated double sampling by the CDS unit 4, clamping by the clamp circuit 5, and A/D conversion by the A/D converter 6. The converted image data is processed by the signal processor 7, and the processed data is input to the system controller 10, thus obtaining photometry values according to amounts of light for respective photometry regions shown in FIG. 12 (S601).

The photometry values of eight photometry regions 102, which are located at the end of a horizontal period and neighbor the OB region 112, of the plurality of photometry regions, are compared with predetermined value A (S602). If at least one of the photometry values of the eight photometry regions 102 is larger than predetermined value A, these values are compared with predetermined value B (S603). If none of the photometry values of the eight photometry regions 102 are larger than predetermined value A, an arithmetic operation is made based on a predetermined arithmetic formula to obtain an exposure condition (S606) Upon comparison with predetermined value B in step S603, if the photometry values of all the eight photometry regions 102 are smaller than predetermined value B, the output timing of a LOW pulse of the pulse signal CPOB to be output from a pulse generation circuit of the timing pulse generator 8 is shifted toward the end of the OB period by a pulse control signal from the system controller 10, as indicated by CPOB switch 1 in FIG. 11 (S604).

On the other hand, upon comparison with predetermined value B in step S603, if at least one of the photometry values of the eight photometry regions 102 is larger than predetermined value B, the output timing of a LOW pulse of the pulse signal CPOB to be output from the pulse generation circuit of the timing pulse generator 8 is further shifted toward the end of the OB period by a pulse control signal from the system controller 10, as indicated by CPOB switch 2 in FIG. 11 (S605). After the pulse setup has been changed in step S604 or S605, an exposure condition is obtained by an arithmetic operation based on a predetermined arithmetic formula, thus ending the photometry sequence.

Figure 21A:
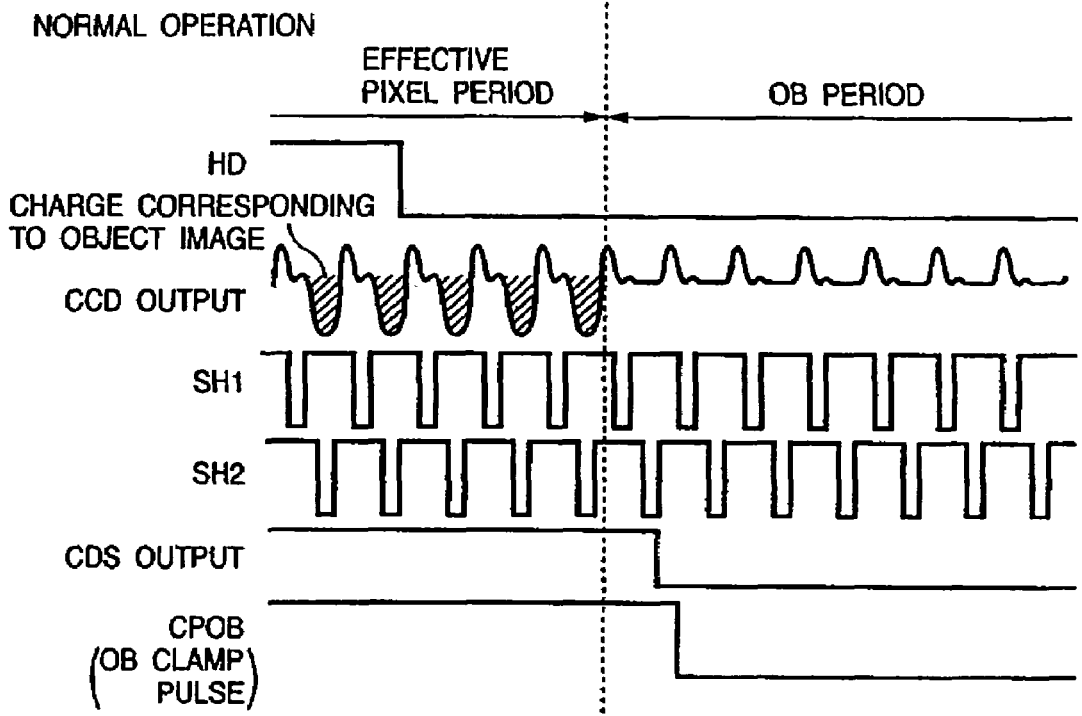
FIG. 21A is a timing chart showing the CCD output waveform and CDS output waveform in a normal operation.
Figure 21B:
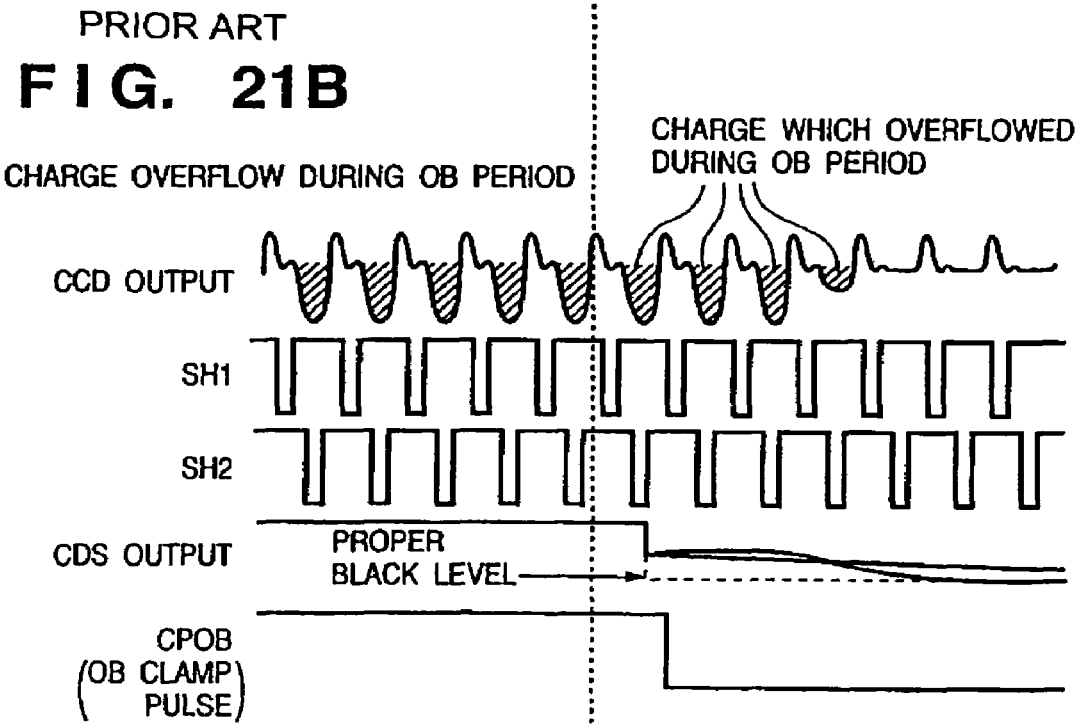
FIG. 21B is a timing chart showing the CCD output waveform and CDS output waveform when charge signals have overflowed into the OB region.
Figure 22:
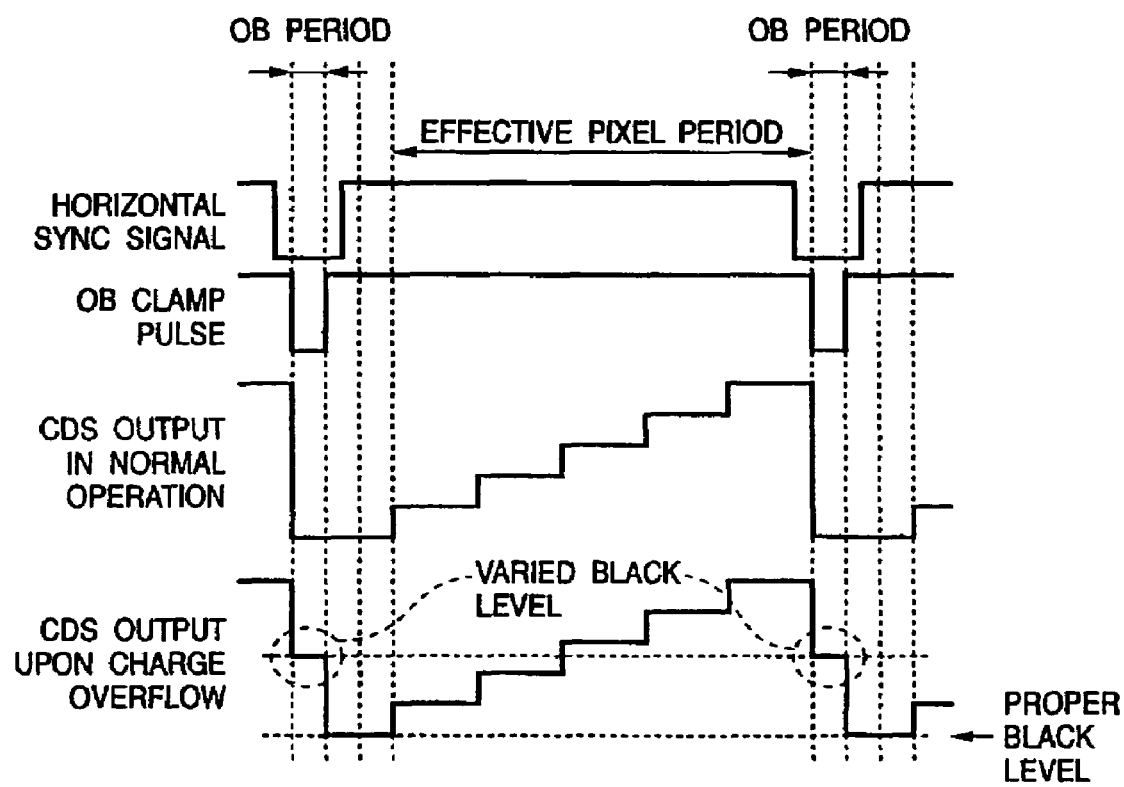
FIG. 22 is a timing chart showing the CDS output waveforms during one horizontal period in a normal operation and when charge signals have overflowed into the OB region.

The CPOB timing change process will be explained below using FIGS. 21A and 21B. The pulse signal CPOB changes to LOW during a certain period in the OB period, as shown in FIG. 21A. When very intense light such as spot light, sunlight, or the like enters, and charge signals overflow into the OB region 112, as shown in the CCD output chart in FIG. 21B, charge signals gradually overflow into the OB region 112 from the effective pixel side.

Hence, the photometry values of the eight photometry regions 102, which are located at the end of a horizontal period and neighbor the OB region 112, are compared with predetermined value A, and if the photometry value of at least one region has exceeded predetermined value A, it is determined that charge signals are likely to overflow into the OB region 112, and the pulse position is shifted toward the end, as indicated by CPOB switch 1 in FIG. 11. Furthermore, if the photometry values of the eight photometry regions are compared with predetermined value B, and the photometry value of at least one photometry region has exceeded predetermined value B, it is determined that charge signals are more likely to overflow into the OB region 112, and the pulse position is further shifted toward the end, as indicated by CPOB switch 2 in FIG. 11. Note that predetermined value A<predetermined value B.

Note, when only the photometry values of photometry regions other than the photometry regions neighboring the OB region 112 are high, namely, when intense light has become incident only on the left part of the effective pixel region 111, the clamp pulse position is not changed and kept fixed.

In this way, since the setup of the clamp pulse generation timing is changed in correspondence with the amount of light that becomes incident on the right side of the frame, even when charge signals are likely to overflow into the OB region 112, a signal of the OB region, which must be the reference signal free from the influence of charge overflow, can be clamped.

Modification of the Fourth Embodiment

Figure 14:
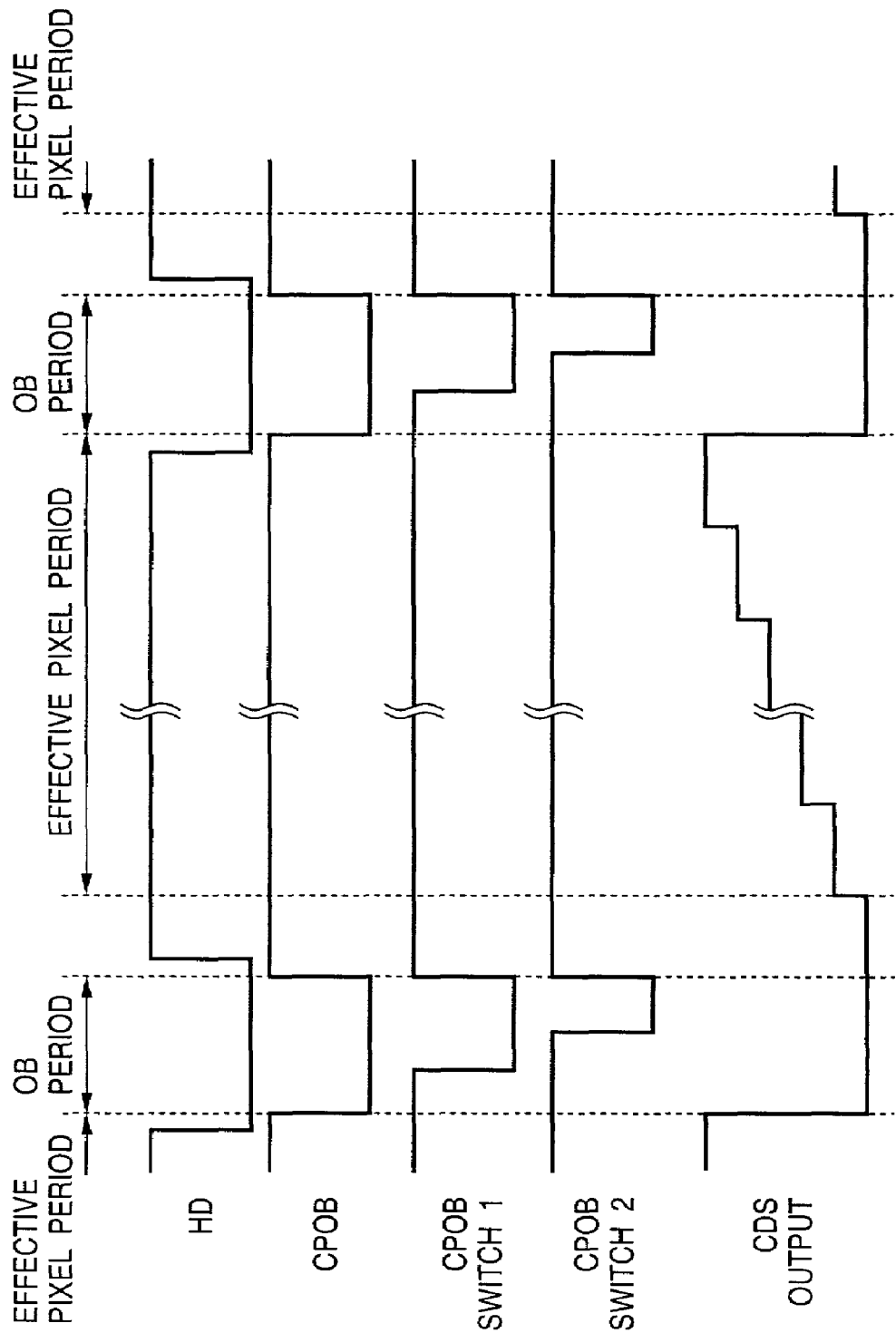
FIG. 14 is a timing chart of an image sensing apparatus according to a modification of the fourth embodiment of the present invention.

As the method of taking a measure against the charge overflow phenomenon into the OB region by changing the setup of the clamp pulse during the OB period, a method shown in FIG. 14 may be used. In FIG. 14, a normal clamp pulse is set to have a pulse duration that can clamp nearly the entire OB period.

As in the case shown in FIG. 11, the photometry values of the eight photometry regions 102 which are located at the end of a horizontal period and neighbor the OB region 112 are compared with predetermined value A. If the photometry value of at least one region has exceeded predetermined value A, the pulse duration is changed to narrow toward the end of the OB period, as indicated by CPOB switch 1 in FIG. 14. Furthermore, if the photometry values are compared to predetermined value B, and the photometry value of at least one region has exceeded predetermined value B, the pulse duration is changed to further narrow toward the end of the OB period, as indicated by CPOB switch 2 in FIG. 14.

With the method shown in FIG. 14, even when charge signals are likely to overflow into the OB region 112, a signal of the OB region, which must be the reference signal free from the influence of charge overflow, can be clamped as in the method shown in FIG. 11.

The method shown in FIG. 14 is particularly effective for the following case. When a small clamp time constant is set in a clamp circuit of an image sensing apparatus, different OB levels are sampled and held, and clamped between lines, and horizontal stripe-like noise may consequently appears on an image, thus degrading image quality. Hence, in the clamp circuit of the conventional image sensing apparatus, a relatively large time constant must be set upon OB clamping in consideration of image quality and response speed. Even when charge signals are likely to overflow into the OB region 112 in such case, a signal can be effectively clamped using the aforementioned method.

In the fourth embodiment and its modification, the position and duration setups of the clamp pulse can be implemented by only a pulse control signal from the system controller 10 without changing the circuit arrangement, i.e., without requiring any extra cost.

In the fourth embodiment and its modification, one of the generation timing and pulse duration of the clamp pulse is controlled, as shown in FIG. 11 or 14, but they may be controlled in combination. For example, as the photometry value becomes larger, the pulse position is controlled to be farther away from effective pixels, and the pulse duration is controlled to narrow. On the other hand, as the photometry value becomes smaller, the pulse position is controlled to approach effective pixels, and the pulse duration is controlled to broaden.

Fifth Embodiment

The fifth embodiment of the present invention will be described below. Note that the basic arrangement and operation of the image sensing apparatus are the same as those described above with reference to FIGS. 1 and 2, and a description thereof will be omitted. Also, the solid-state image sensing element 3 has the same structure as that shown in FIGS. 20A and 20B, and the segmented photometry regions upon photometry are the same as those shown in FIG. 12. Furthermore, since the timing chart is substantially the same as that explained using FIG. 3 except for CPOB and the OB level of the CDS output, a detailed description using the timing chart of FIG. 3 will be omitted.

The operation of the image sensing apparatus in the fifth embodiment of the present invention will be described below with reference to the block diagram in FIG. 15, the timing chart in FIG. 16, and the flow chart of the photometry sequence in FIG. 17.

Figure 15:
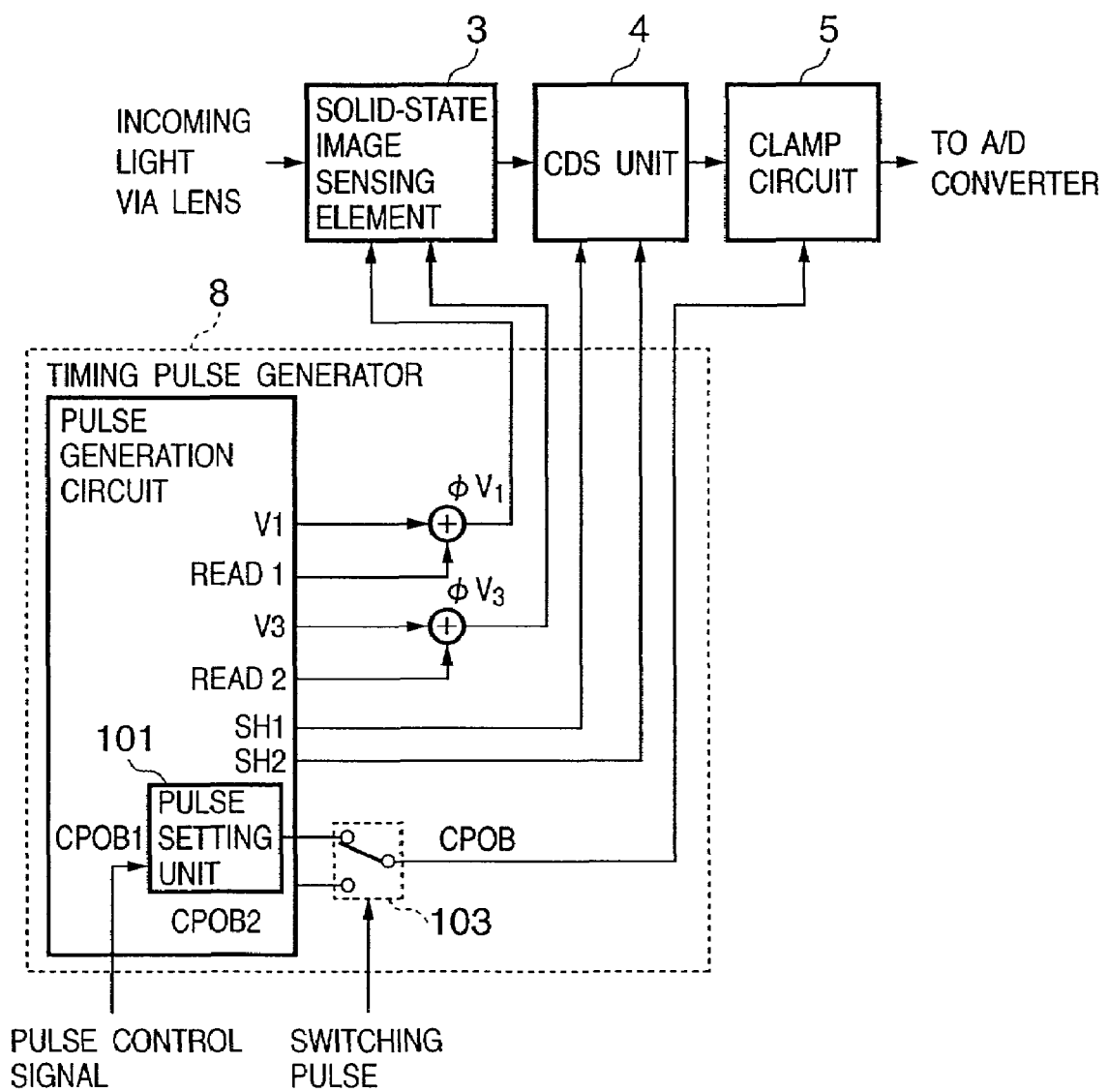
FIG. 15 is a block diagram showing the arrangement from a solid-state image sensing element to a clamp circuit, and the arrangement of a timing pulse generator according to a fifth embodiment of the present invention.

The same reference numerals in FIG. 15 denote blocks having the same functions as those in FIG. 10, and a detailed description thereof will be omitted. Reference numeral 103 denotes a switch for switching a clamp pulse signal CPOB to be output to the clamp circuit 5 to one of CPOB1 and CPOB2. The switch 103 is controlled by a switching pulse from the system controller 10. As shown in FIG. 16, the pulse signal CPOB1 changes to LOW during a predetermined period in the OB period, and the pulse signal COPB2 changes to LOW during a so-called dummy period between the horizontal blanking period and effective pixel period. During this dummy period, charge signals in a portion 118 that does not receive any charge signals from the vertical transfer registers 115 in the horizontal transfer register 116 are transferred (see FIG. 20B). In other words, the level of these signals can be considered as a pseudo black level, although the level of those signals from the portion 118 does not exactly match an original optical black level.

The following explanation will be given with reference to the flow chart of the photometry sequence in FIG. 17. The same step numbers in FIG. 17 denote the steps of the same operations as those in FIG. 13. When the photometry sequence starts, object light that has entered via the lens is received by the solid-state image sensing element 3, and its output signal undergoes correlated double sampling by the CDS unit 4, clamping by the clamp circuit 5, and A/D conversion by the A/D converter 6. The converted image data is processed by the signal processor 7, and the processed data is input to the system controller 10, thus obtaining photometry values according to the amounts of light for respective photometry regions shown in FIG. 12 (S601).

The photometry values of eight photometry regions 102, which are located at the end of a horizontal period and neighbor the OB region 112, of the plurality of photometry regions, are compared with predetermined value A (S602). If at least one of the photometry values of the eight photometry regions 102 is larger than predetermined value A, these values are compared with predetermined value B (S603). If none of the photometry values of the eight photometry regions 102 are larger than predetermined value A, an arithmetic operation is made based on a predetermined arithmetic formula to obtain an exposure condition (S606) Upon comparison with predetermined value B in step S603, if the photometry values of all the eight photometry regions 102 are smaller than predetermined value B, the output position of the LOW pulse of the pulse signal CPOB1 to be output from the pulse generation circuit of the timing pulse generator 8 is shifted toward the end of the OB period by a pulse control signal from the system controller 10, as indicated by CPOB1 switch 1 in FIG. 16 (step S604).

On the other hand, upon comparison with predetermined value B instep S603, if at least one of the photometry values of the eight photometry regions 102 is larger than predetermined value B, the values are further compared with predetermined value C (S901). Upon comparison with predetermined value C in step S901, if the photometry values of all the eight photometry regions 102 are smaller than predetermined value C, the output position of the pulse signal is further shifted toward the end of the OB period (S605). That is, the output position of the LOW pulse of the pulse signal CPOB1 to be output from the pulse generation circuit of the timing pulse generator 8 is further shifted toward the end of the OB period by a pulse control signal from the system controller 10, as indicated by CPOB1 switch 2 in FIG. 16.

On the other hand, upon comparison with predetermined value C in step S901, if the photometry value of at least one of the eight photometry regions 102 is larger than predetermined value C, the clamp pulse is switched from CPOB1 to CPOB2 (S902). That is, it is determined that charge signals are more likely to overflow into the OB region 112, and the clamp pulse to be supplied to the clamp circuit 5 is switched from CPOB1 to CPOB2 by controlling the switch 103 by a switching pulse from the system controller 10.

Figure 16:
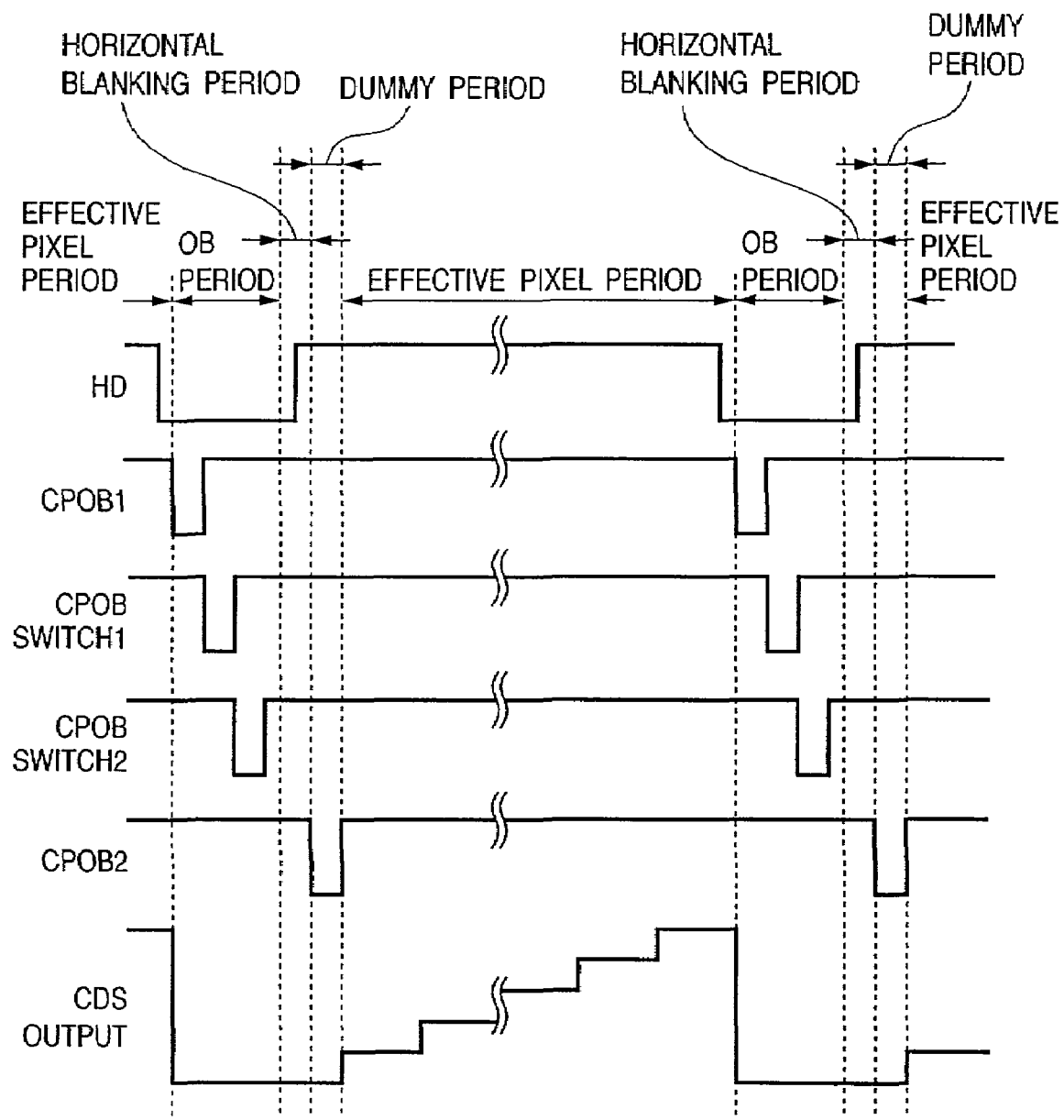
FIG. 16 is a timing chart of an image sensing apparatus according to the fifth embodiment of the present invention.
Figure 17:
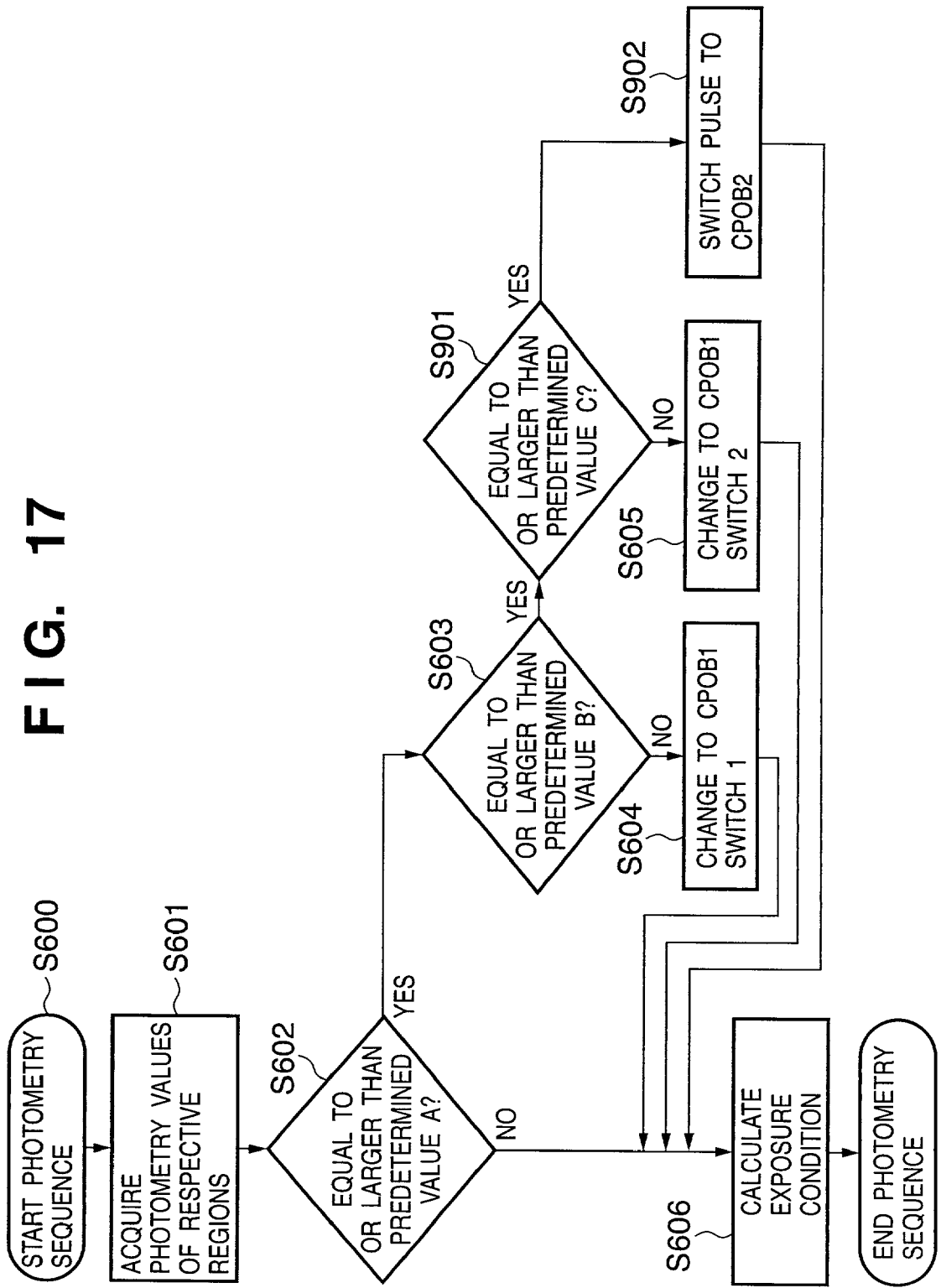
FIG. 17 is a flow chart of a photometry sequence according to the fifth embodiment of the present invention.

The pulse signal CPOB2 changes to LOW during a so-called dummy period between the horizontal blanking period and effective pixel period, as shown in FIG. 16. During this dummy period, charge signals in a portion that does not receive any charge signals from the vertical transfer registers 115 in the horizontal transfer register are transferred, and the level of these signals can be considered as a pseudo black level, which does not exactly match an original optical black level. Therefore, upon receiving CPOB2, the clamp circuit 5 can clamp at a clamp potential nearly equal to that in a normal state. That is, in a normal state in which no charge signals overflow into the OB region 112, a proper black level can be clamped by setting the original clamp pulse CPOB1. On the other hand, when charge signals are likely to overflow into the entire OB region 112, signals can be clamped at a nearly normal clamp potential by clamping the dummy period of a pseudo black level, although it does not exactly match the original optical black level, by setting the clamp pulse CPOB2.

When the level difference between the dummy period and OB period is not negligible, the level difference between the normal clamp potential and the clamp potential during the dummy period is acquired in advance and is held so as to correct the level difference in the clamp circuit 5 or A/D converter 6.

Depending on values set as predetermined values A, B, and C, the clamp pulse to be supplied to the clamp circuit can be immediately switched from CPOB1 to CPOB2 without changing the setup of the pulse position of the clamp pulse CPOB1.

When the pulse setup has changed in step S604 or S605, or after the pulse has been switched in step S902, an exposure condition is obtained by an arithmetic operation based on a predetermined arithmetic formula, thus ending the photometry sequence.

According to the solid-state image sensing apparatus that executes the signal process of the fifth embodiment, since the generation timing or pulse duration of the clamp pulse signal to be input to the clamp circuit is changed to be shifted toward the end of the OB period in correspondence with the amount of light that becomes incident on the effective pixel region which neighbors the OB region, the OB region free from any charge overflow can be clamped at a later OB period.

When the amount of light that becomes incident on the effective pixel region which neighbors the OB region has become equal to or larger than a predetermined value, and charge signals are likely to overflow into the entire OB region, the clamp pulse signal to be input to the clamp circuit is switched from a pulse which clamps the OB period to that which clamps the dummy period, a pseudo black level nearly equal to a proper black level can be clamped.

The method of setting the generation timing and pulse duration of the clamp pulse and switching the clamp pulse to another one can be implemented without changing any circuits, thus providing advantages in terms of cost.

In the fifth embodiment, since the clamp pulse can be switched by controlling only the switching pulse from the system controller without changing any circuit arrangement, this embodiment can be implemented without requiring any extra cost.

In the fourth and fifth embodiments, the clamp pulse is controlled by comparing the photometry values with predetermined values A, B, and C. Alternatively, the generation timing and pulse duration of the pulse may be controlled in correlation with the photometry values. For example, as the photometry value becomes larger, the pulse generation timing may be controlled to a timing at which the clamp position of the OB region is farther away from the effective pixels, or the pulse duration may be controlled to narrow. On the other hand, as the photometry value becomes smaller, the pulse generation timing may be controlled to a timing at which the clamp position of the OB region approaches the effective pixels, or the pulse duration may be controlled to broaden. In this case, a change in setup can be linearly made with respect to the photometry value.

Figure 18A:
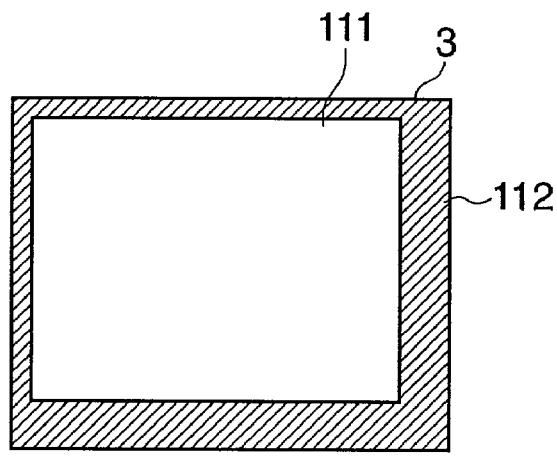
FIGS. 18A and 18B are explanatory views showing the structure of another solid-state image sensing element chip.
Figure 18B:
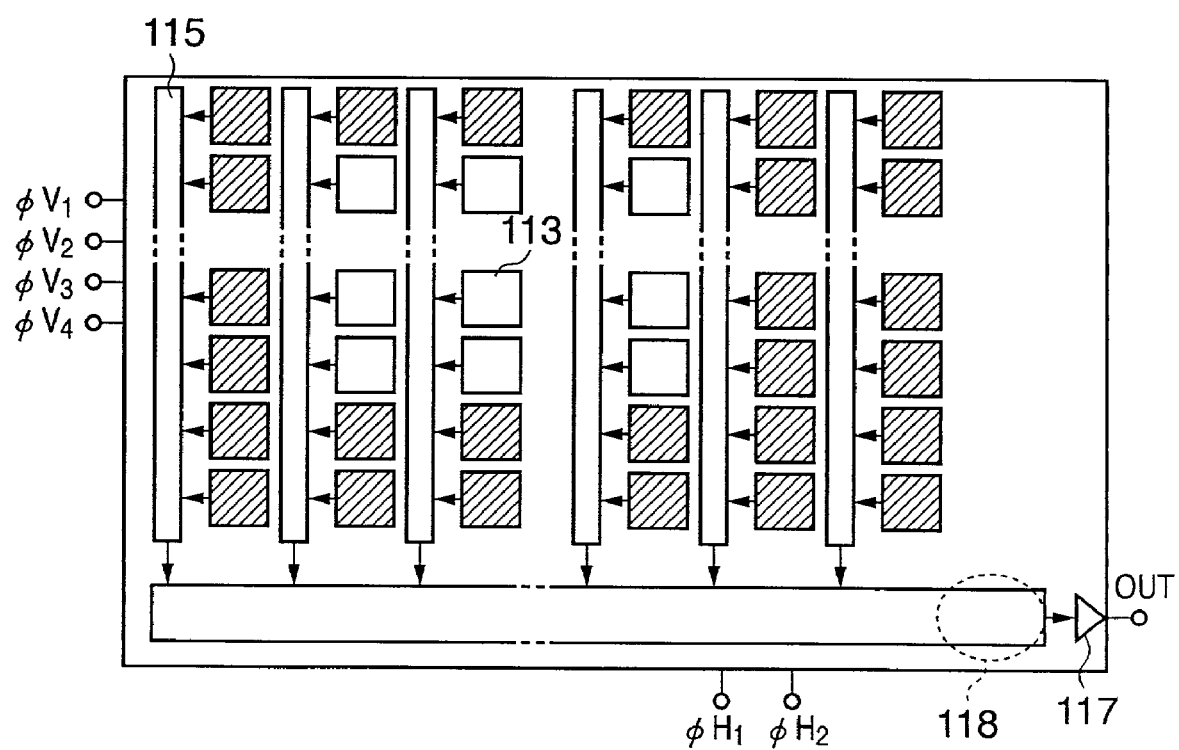
Figure 19:
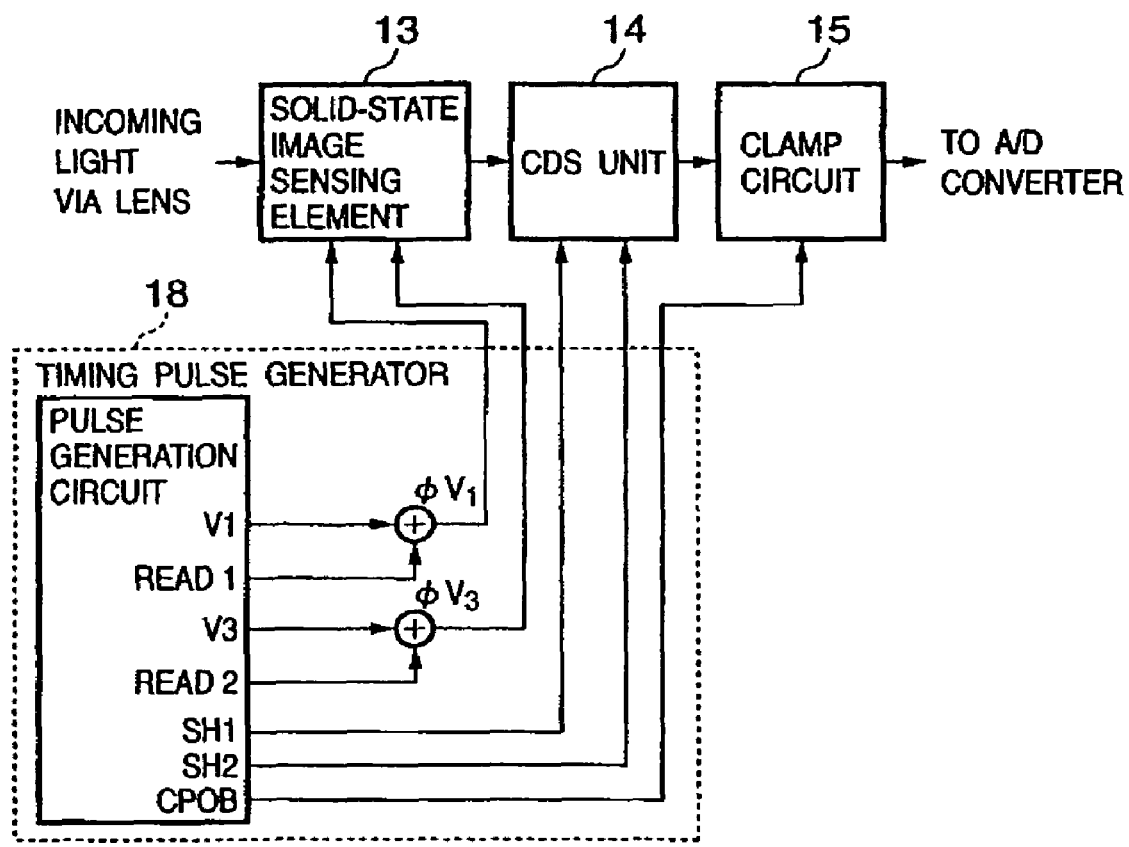
FIG. 19 is a block diagram showing the arrangement from a solid-state image sensing element to a clamp circuit, and the arrangement of a timing pulse generator in a conventional image sensing apparatus.
Figure 20A:
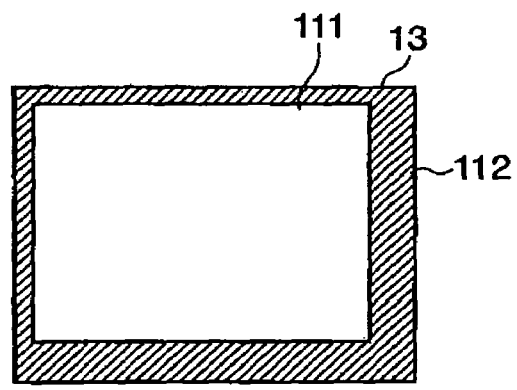
FIGS. 20A and 20B are views for explaining the structure of a solid-state image sensing element chip.
Figure 20B:
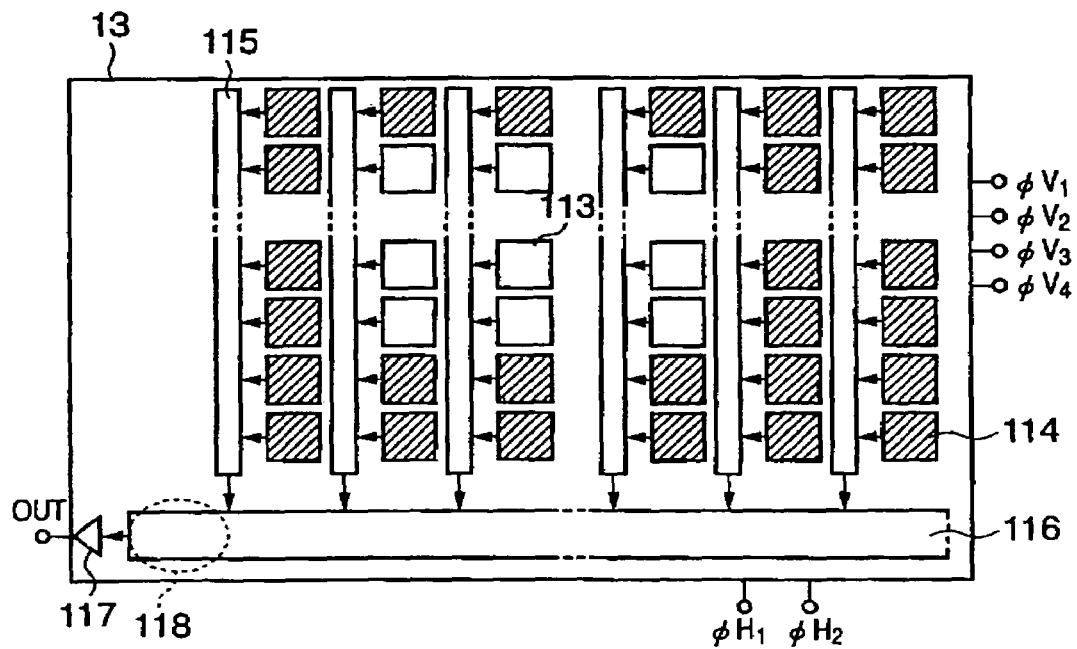

The fourth and fifth embodiments have been explained using the chip structure of the solid-state image sensing element in the solid-state image sensing apparatus shown in FIGS. 20A and 20B. However, the present invention is not limited to this. For example, the chip structure of the solid-state image sensing element shown in FIGS. 18A and 18B may be used. That is, the output circuit 117 is located on the opposite side of the OB region 112 in FIG. 20B, while both the OB region 112 and output circuit 117 are located on the right side in FIG. 18B. In this case as well, when the photometry value is high, a portion of the OB region 112, which is possibly farthest from the effective pixel period, is to be clamped. Therefore, when the output circuit 117 and OB region 112 are located at the same side, horizontal transfer of charge signals is made rightward, and pixels of the OB region 112 into which charge signals have overflowed are read at an earlier timing. Therefore, the generation timing and/or pulse duration of the pulse may be controlled to be shifted in a direction opposite to that in the fourth and fifth embodiments during the OB period after one horizontal period.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and LAN, can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
an image sensing element having a plurality of pixels configured to generate charges in correspondence with an amount of incoming light, a plurality of vertical transfer units and a horizontal transfer unit configured to transfer a plurality of charge signals generated by the plurality of pixels; and
a controller that controls said vertical transfer units to transfer and discard noise charge accumulated in each of said vertical transfer units during exposing said image sensing element a plurality of times after said image sensing element is exposed for a predetermined period of time and before any of the charge signals generated by the pixels are transferred to said vertical transfer units,
wherein the transferring and discarding of noise charge accumulated in said vertical transfer units by said controller includes a first transfer of noise charges at a first transfer speed, and a second transfer of noise charges at a second transfer speed different from the first transfer speed,
wherein the first transfer is performed in a charge sweep-away period of said noise charge and the second transfer is performed in an idle read period of said vertical and horizontal transfer units.

2. The apparatus according to claim 1, wherein said image sensing element has a light-shielded region, and said apparatus further comprises a clamp unit adapted to clamp charge signals obtained from the light-shielded region of the charge signals transferred by the vertical transfer units to a predetermined reference voltage.

3. The apparatus according to claim 1, wherein the transfer speed used in the first transfer is faster than the transfer speed used in the second transfer.

4. An image sensing apparatus comprising:
an image sensing element having a plurality of pixels configured to generate charges in correspondence with an amount of incoming light, a plurality of vertical transfer units and a horizontal transfer unit configured to transfer a plurality of charge signals generated by the plurality of pixels; and
a controller that performs a plurality of high-speed transfers of noise charge accumulated in each of the vertical transfer units after said image sensing element is exposed for a predetermined period of time and before any of the charge signals generated by the pixels are transferred to the vertical transfer units,
wherein said plurality of high speed transfers comprises a first transfer of the noise charge performed in a charge sweep-away period of said noise charge and a second transfer of the noise charge performed in an idle read period of said vertical and horizontal transfer units.

5. A method of controlling an image sensing apparatus, which comprises an image sensing element having a plurality of pixels configured to generate charges in correspondence with an amount of incoming light, a plurality of vertical transfer units and a horizontal transfer unit configured to transfer a plurality of charge signals generated by the plurality of pixels, comprising:
exposing the image sensing element for a predetermined period of time; and
driving said vertical transfer units a plurality of times after the exposing step and before any of the charge signals generated by the pixels during the exposing step are transferred to the vertical transfer units, wherein the driving step comprises:
performing a first transfer of noise charge accumulated in each of said vertical transfer units; and
performing a second transfer of noise charge accumulated in each of said vertical transfer units using a transfer speed different from a transfer speed used in the first transfer,
wherein said first transfer is performed in a charge sweep-away period of said noise charge, and
wherein said second transfer is performed in an idle read period of said vertical and horizontal transfer units.

6. The method according to claim 5, wherein the image sensing element has a light-shielded region, and the image sensing apparatus further comprises a clamp unit for clamping charge signals obtained from the light-shielded region of the charge signals transferred by the vertical and horizontal transfer units to a predetermined reference voltage.

7. The method according to claim 5, wherein the transfer speed used in the first transfer is faster than the transfer speed used in the second transfer.

8. A method of controlling an image sensing apparatus, which comprises an image sensing element having a plurality of pixels configured to generate charges in correspondence with an amount of incoming light, a plurality of vertical transfer units and a horizontal transfer unit configured to transfer a plurality of charge signals generated by the plurality of pixels, comprising:
exposing said image sensing element for a predetermined period of time; and transferring to the vertical transfer units the charge signals generated by the pixels during the exposing step, wherein the method further comprises performing a plurality of high-speed transfers of noise charge accumulated in each of the vertical transfer units after the exposure step and before the transfer step performed successively after said exposure step, wherein said plurality of high speed transfers comprises a first transfer that is performed in a charge sweep-away period of said noise charge, and a second transfer that is performed in an idle read period of said vertical and horizontal transfer units.

9. A computer program product comprising a computer usable medium having computer readable program code means embodied in said medium for a method of controlling an image sensing apparatus, which comprises an image sensing element having a plurality of pixels configured to generate charges in correspondence with an amount of incoming light, a plurality of vertical transfer units and a horizontal transfer unit configured to transfer a plurality of charge signals generated by the plurality of pixels, said product comprising:

first computer readable program code means for exposing said image sensing element for a predetermined period of time;

second computer readable program code means for performing a first transfer of noise charge accumulated in each of said vertical transfer units at a first transfer speed;

third computer readable program code means for performing a second transfer of noise charge accumulated in each of said vertical transfer units using a second transfer speed different from the first transfer speed; and fourth computer readable program code means for transferring to the vertical transfer units the charge signals generated by the pixels after exposing said image sensing element, wherein said first and second transfers are performed after the image sensing element is exposed and before any of the charge signals generated by the pixels are transferred to the vertical transfer units, wherein said first transfer is performed in a charge sweep-away period of said noise charge, and wherein said second transfer is performed in an idle read period of said vertical and horizontal transfer units.

10. A computer program product comprising a computer usable medium having computer readable program code means embodied in said medium for a method of controlling an image sensing apparatus, which comprises an image sensing element having a plurality of pixels configured to generate charges in correspondence with an amount of incoming light, a plurality of vertical transfer units and a horizontal transfer unit configured to transfer a plurality of charge signals generated by the plurality of pixels, said product comprising:

computer readable program code means for performing a plurality of high-speed transfers of noise charges accumulated in each of the vertical transfer units after said image sensing element is exposed for a predetermined period of time and before any of the charge signals generated by the pixels are transferred to the vertical transfer units, wherein said plurality of high speed transfers comprises a first transfer that is performed in a charge sweep-away period of said noise charge, and a second transfer that is performed in an idle read period of said vertical and horizontal transfer units.

* * * * *